(12) United States Patent
Moyer

(10) Patent No.: US 8,313,224 B2
(45) Date of Patent: *Nov. 20, 2012

(54) MODULAR LIGHTING SYSTEM

(76) Inventor: Calvin W. Moyer, Gilbert, AZ (US)

( * ) Notice: Subject to any disclaimer, the term of this patent is extended or adjusted under 35 U.S.C. 154(b) by 159 days.

This patent is subject to a terminal disclaimer.

(21) Appl. No.: 12/174,153

(22) Filed: Jul. 16, 2008

(65) Prior Publication Data

US 2010/0014310 A1 Jan. 21, 2010

(51) Int. Cl.
*G02B 6/04* (2006.01)
*G02B 6/42* (2006.01)

(52) U.S. Cl. ............ 362/554; 362/1; 362/576; 385/900; 385/901

(58) Field of Classification Search .............. 362/2, 231, 362/551–583, 600–634, 1, 20, 145, 147; 136/246, 248, 253, 291; 385/900, 901
See application file for complete search history.

(56) References Cited

U.S. PATENT DOCUMENTS

| | | | | |
|---|---|---|---|---|
| 3,088,025 A * | 4/1963 | Deaton | | 362/354 |
| 3,991,741 A | 11/1976 | Northrup, Jr. et al. | | |
| 4,152,752 A * | 5/1979 | Niemi | | 362/576 |
| 4,246,477 A * | 1/1981 | Latter | | 250/214 AL |
| 4,249,516 A | 2/1981 | Stark | | |
| 4,373,308 A | 2/1983 | Whittaker | | |
| 4,511,755 A | 4/1985 | Mori | | |
| 4,525,031 A * | 6/1985 | Mori | | 359/597 |
| 4,539,625 A * | 9/1985 | Bornstein et al. | | 362/576 |
| 4,968,355 A | 11/1990 | Johnson | | |
| 5,022,736 A | 6/1991 | Mori | | |
| 5,371,660 A * | 12/1994 | Levens | | 362/552 |
| 5,479,276 A * | 12/1995 | Herbermann | | 349/5 |
| 5,581,447 A | 12/1996 | Raasakka | | |
| 5,709,456 A | 1/1998 | Smith et al. | | |
| 5,836,669 A * | 11/1998 | Hed | | 362/92 |
| 5,851,309 A | 12/1998 | Kousa | | |
| 6,007,226 A * | 12/1999 | Howard | | 362/576 |
| 6,020,554 A | 2/2000 | Kaminar et al. | | |
| 6,037,535 A | 3/2000 | Yoshino | | |
| 6,299,317 B1 | 10/2001 | Gorthala | | |
| 6,341,041 B1 * | 1/2002 | Carlson | | 359/591 |
| 6,739,745 B1 * | 5/2004 | Valdes | | 362/554 |
| 6,957,650 B2 | 10/2005 | Nyhart, Jr. et al. | | |
| 6,958,868 B1 | 10/2005 | Pender | | |
| 7,118,253 B1 * | 10/2006 | Simon | | 362/328 |
| 7,130,102 B2 | 10/2006 | Rabinowitz | | |
| 7,190,531 B2 | 3/2007 | Dyson et al. | | |
| 7,566,137 B2 * | 7/2009 | Veskovic | | 362/1 |
| 7,858,875 B2 | 12/2010 | Lu | | |
| 7,973,235 B2 * | 7/2011 | Muhs et al. | | 136/246 |
| 8,139,908 B2 * | 3/2012 | Moyer | | 385/25 |
| 2002/0066473 A1 | 6/2002 | Levy et al. | | |
| 2002/0085393 A1 * | 7/2002 | Eisenman et al. | | 362/576 |
| 2004/0187908 A1 * | 9/2004 | Muhs et al. | | 136/246 |
| 2005/0220680 A1 | 10/2005 | Ma et al. | | |
| 2005/0229964 A1 * | 10/2005 | Liao et al. | | 136/252 |
| 2006/0016448 A1 | 1/2006 | Ho | | |
| 2006/0067089 A1 * | 3/2006 | Hocquard et al. | | 362/576 |
| 2007/0064425 A1 * | 3/2007 | Frecska et al. | | 362/253 |

(Continued)

*Primary Examiner* — Alan Cariaso
(74) *Attorney, Agent, or Firm* — Greg Martinez

(57) ABSTRACT

A light emitting fixture carried by a ceiling, wherein the fixture includes an electrical light source which emits generated light in response to an electrical signal and an optical fiber with light emitting and light collecting ends. The optical fiber emits collected light from the light emitting end in response to receiving incident light at the light receiving end.

43 Claims, 30 Drawing Sheets

U.S. PATENT DOCUMENTS

| | | |
|---|---|---|
| 2008/0037273 A1* | 2/2008 | Muehlemann et al. ....... 362/581 |
| 2008/0047082 A1 | 2/2008 | Hong |
| 2009/0056703 A1 | 3/2009 | Mills et al. |
| 2010/0014310 A1 | 1/2010 | Moyer |
| 2010/0252026 A1 | 10/2010 | Schilling et al. |

* cited by examiner

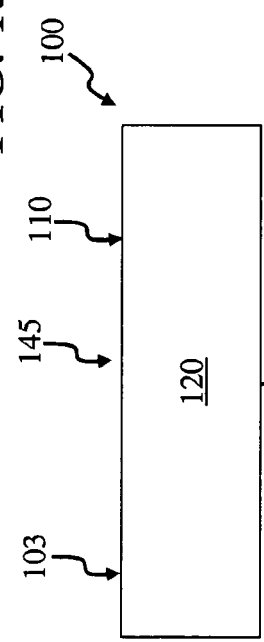
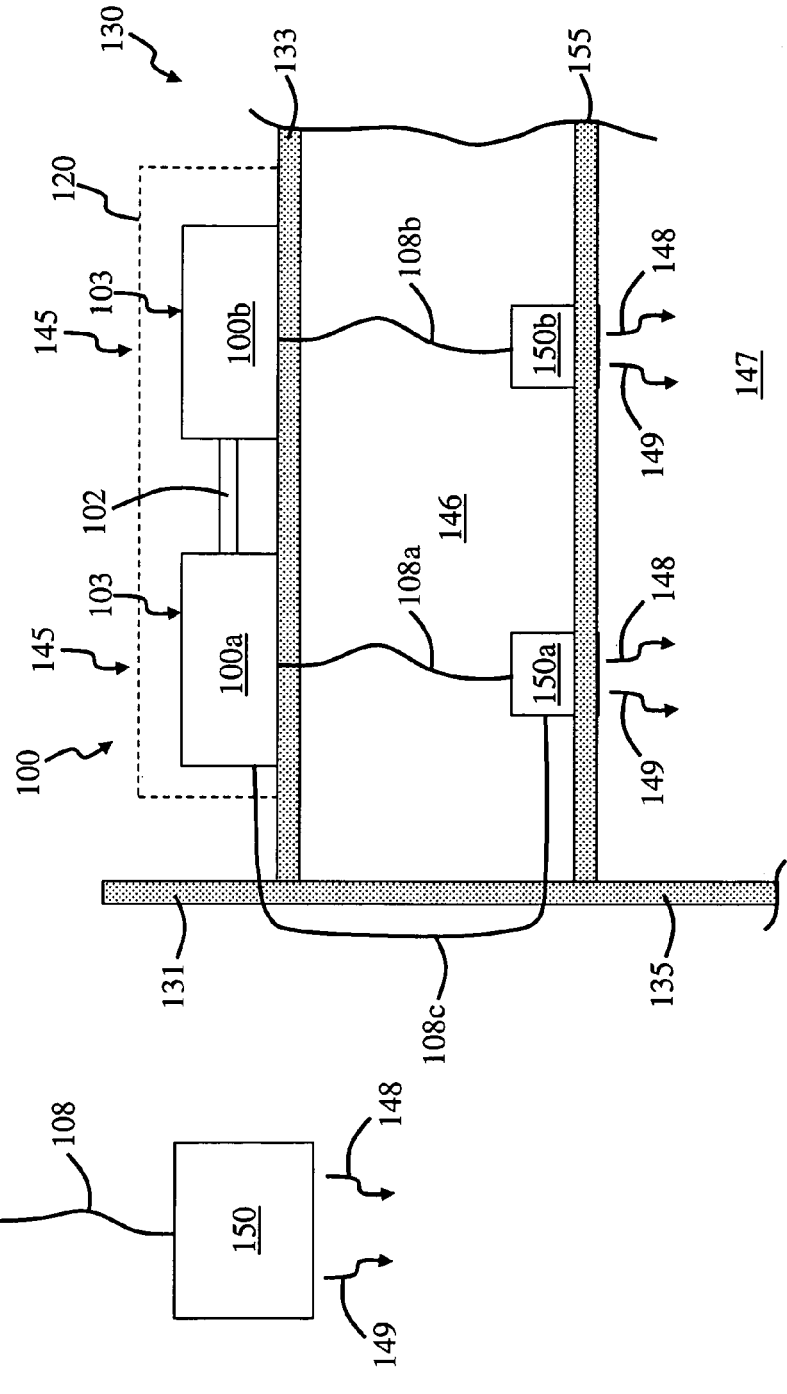

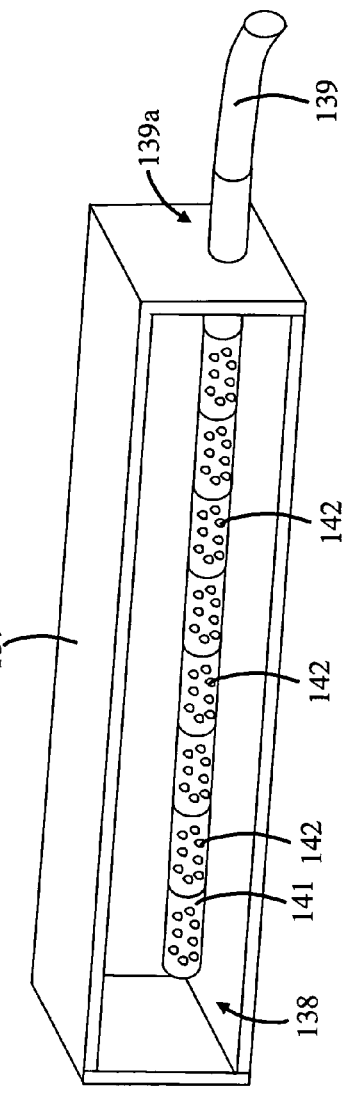
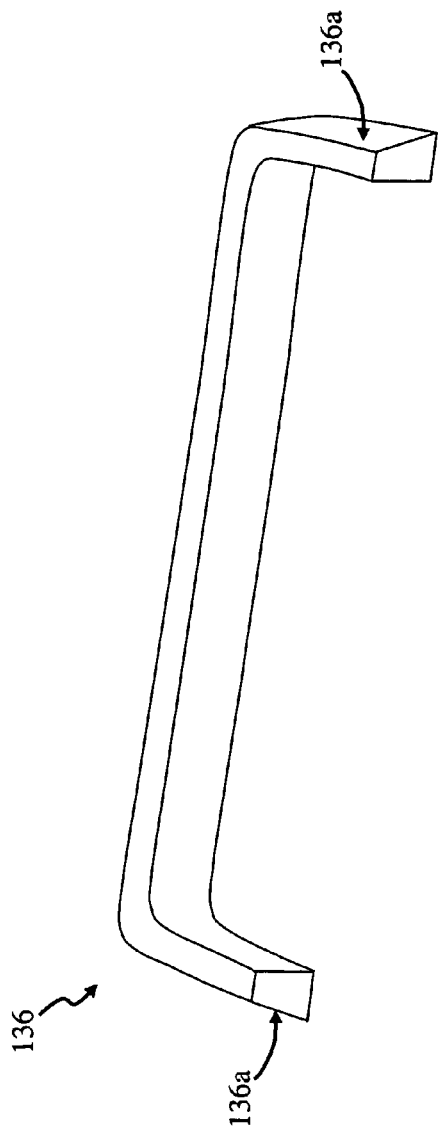
FIG. 1d
FIG. 1e

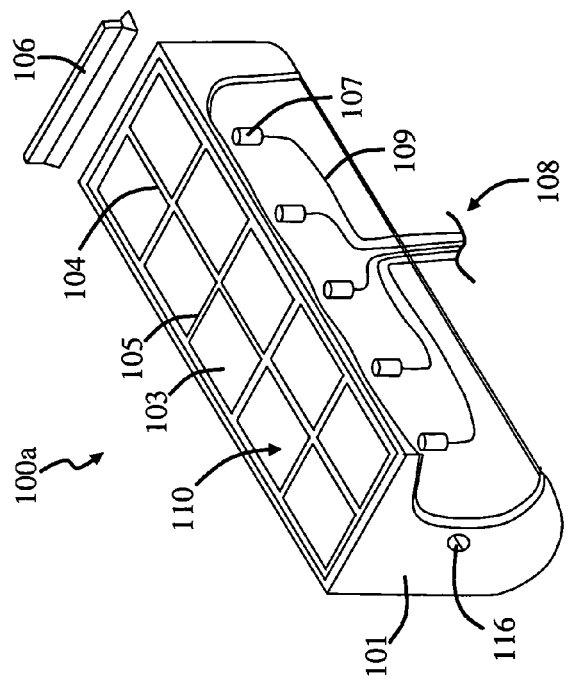
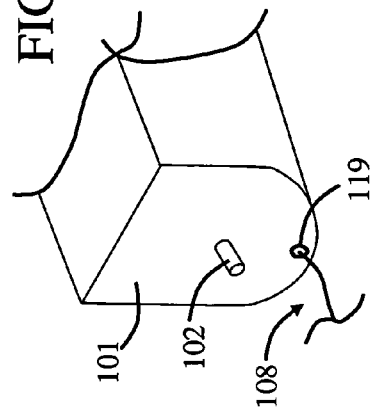
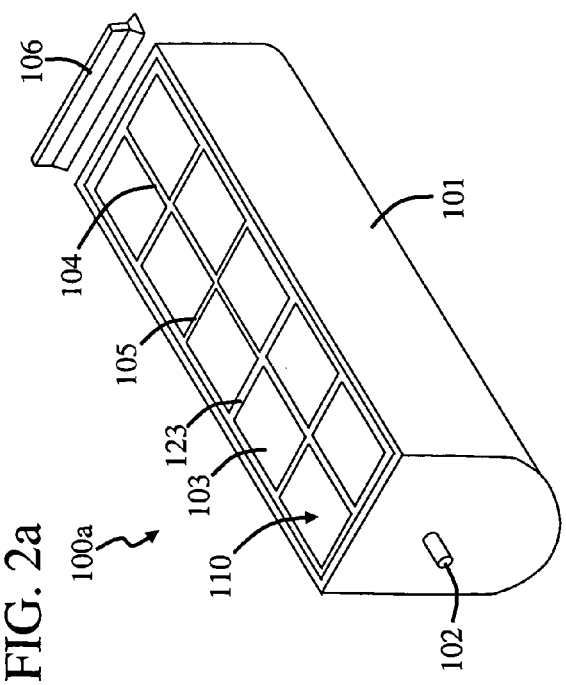
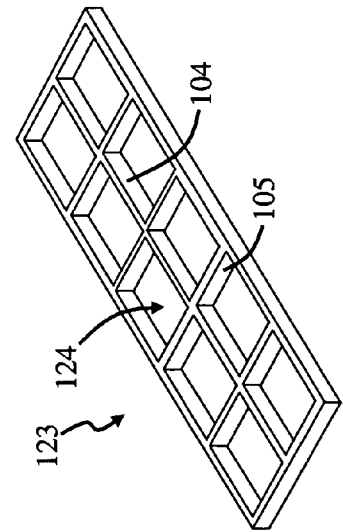

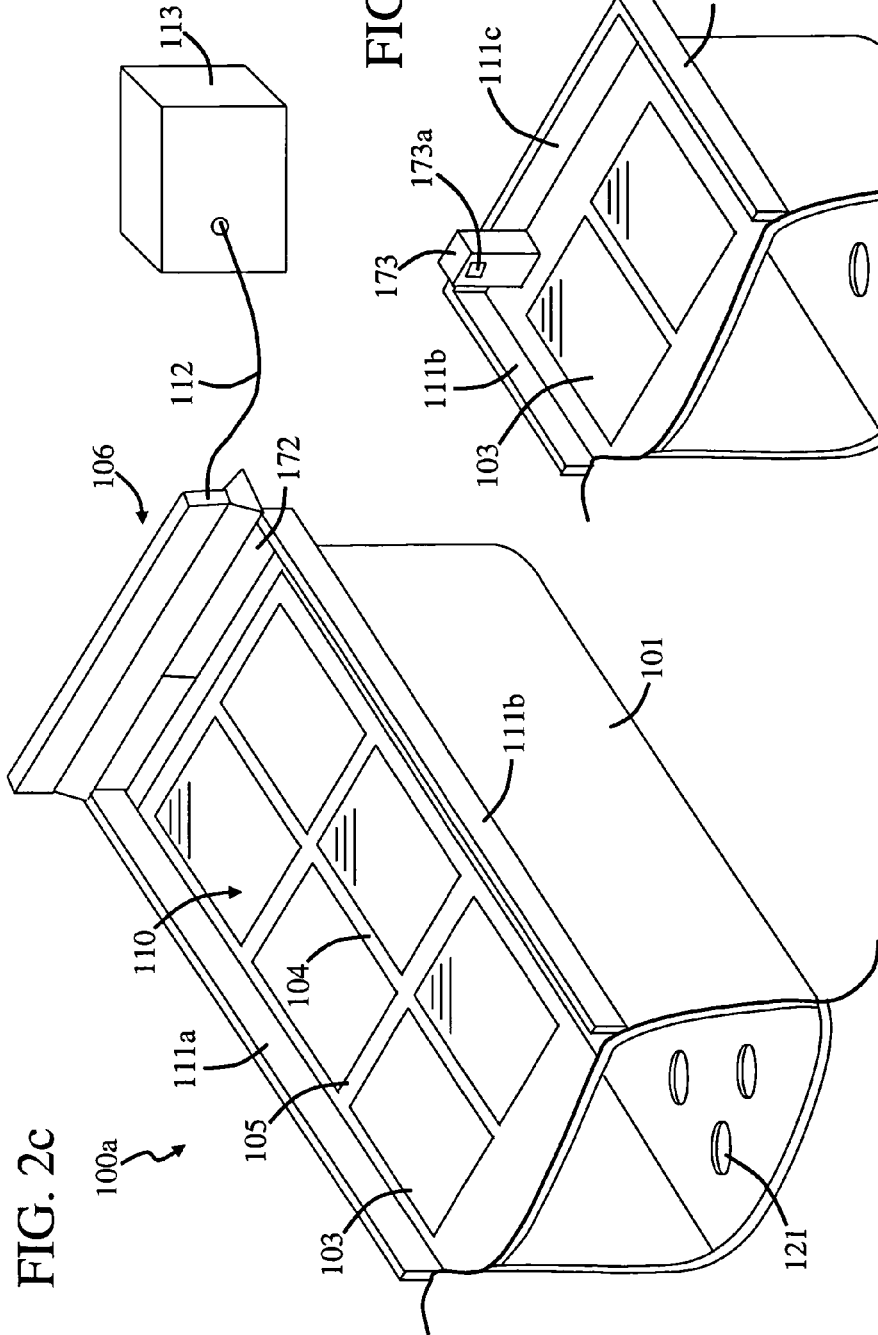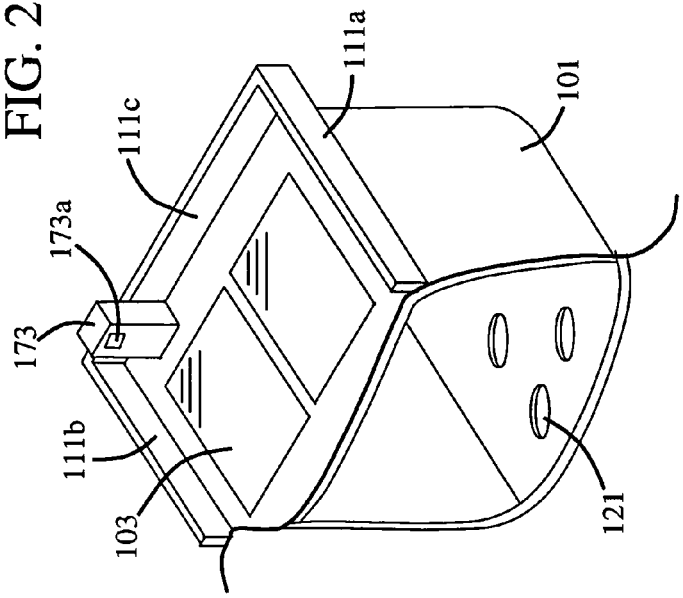

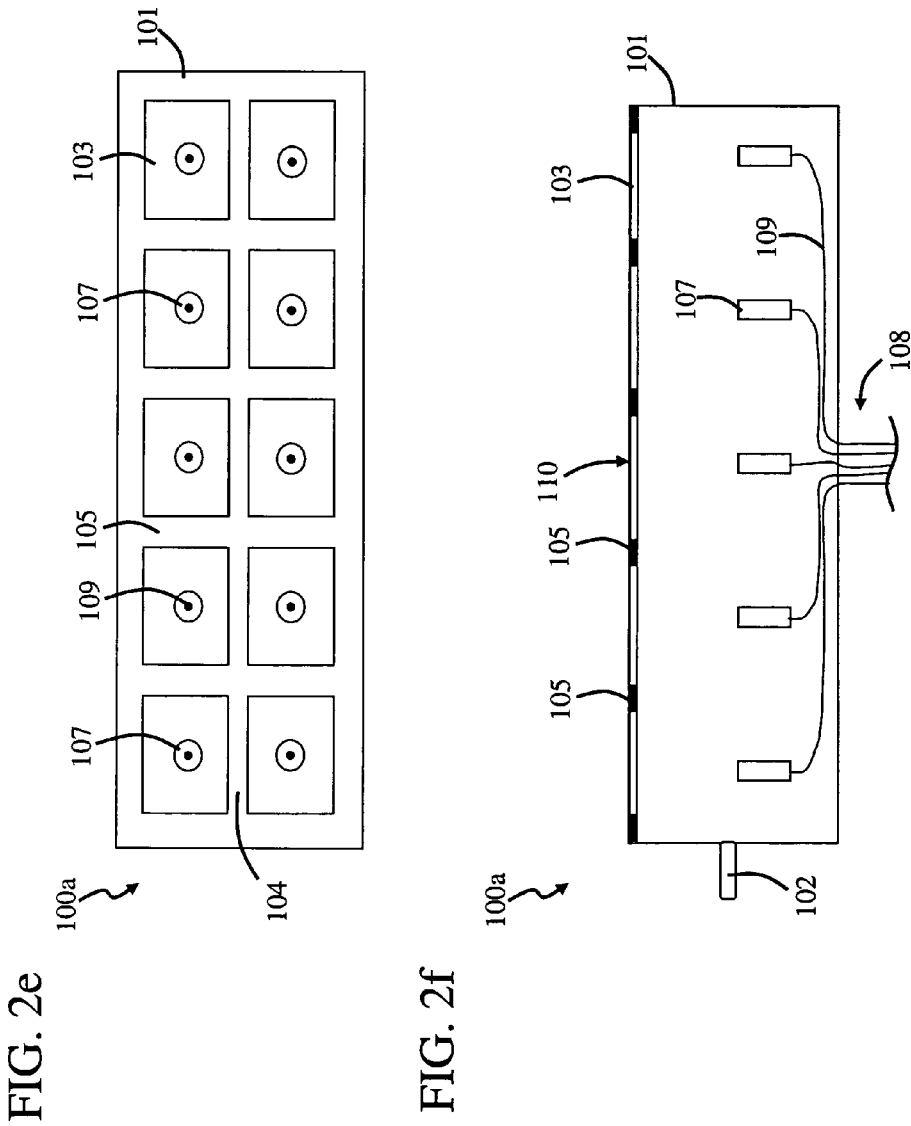

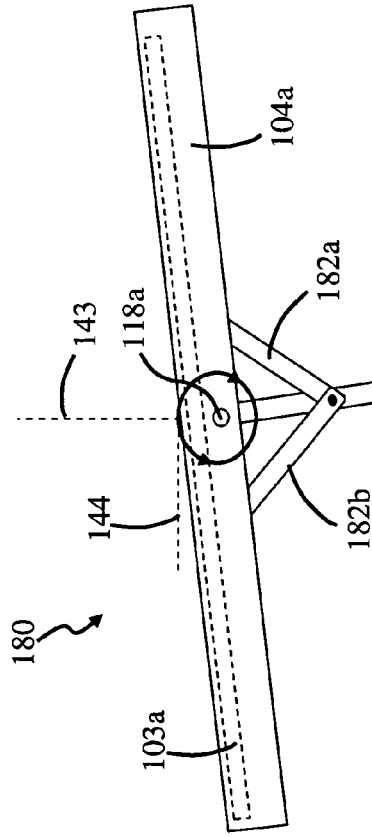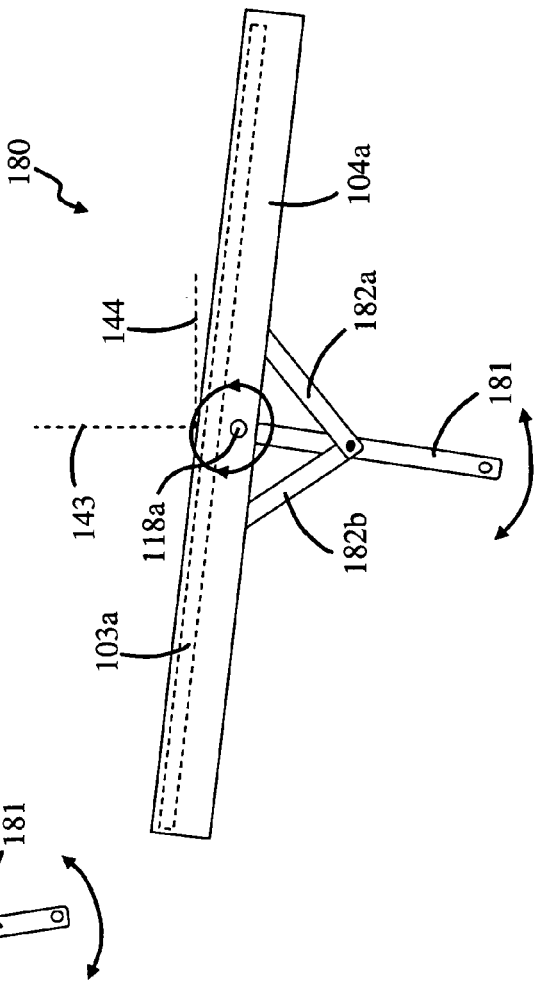

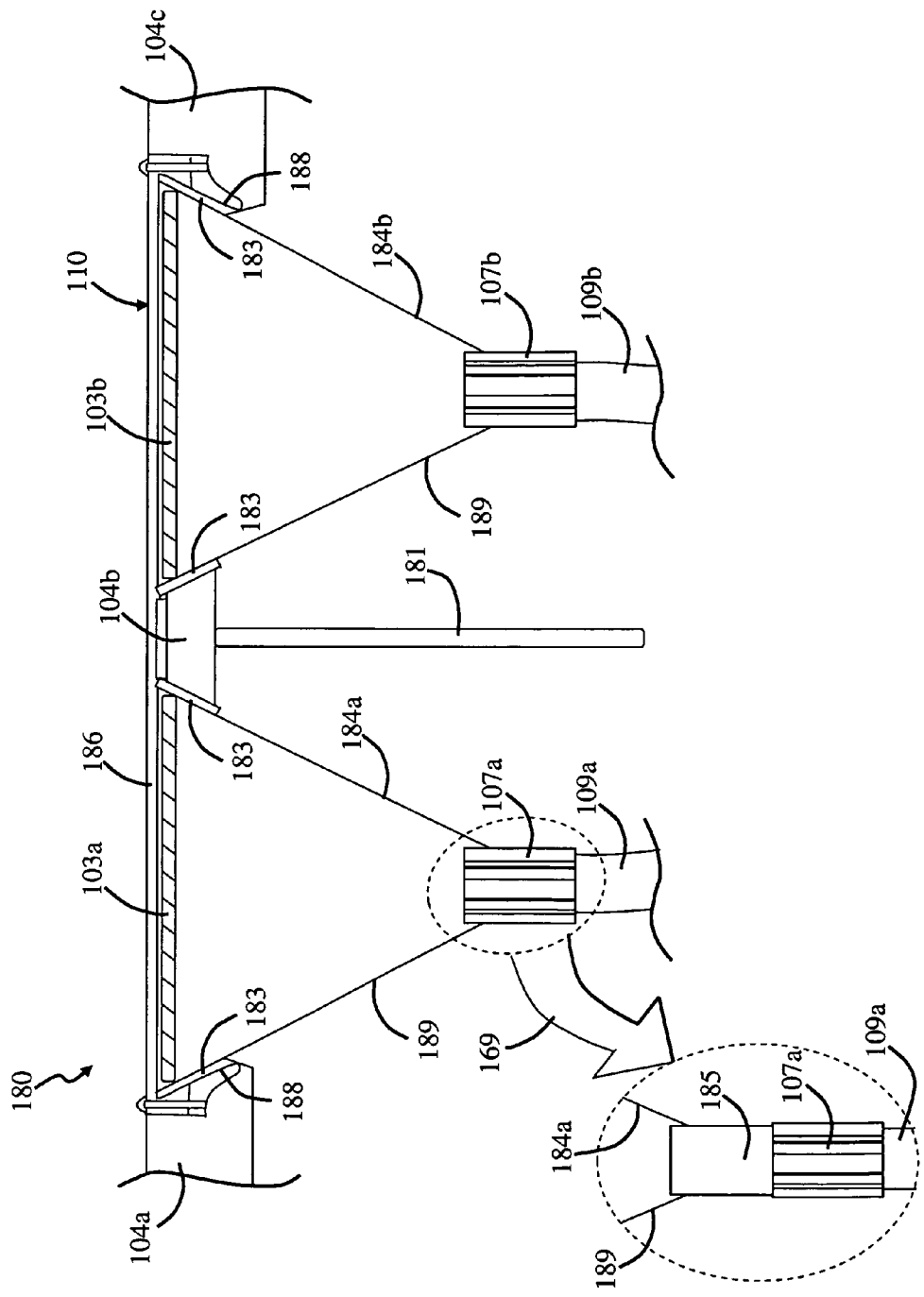

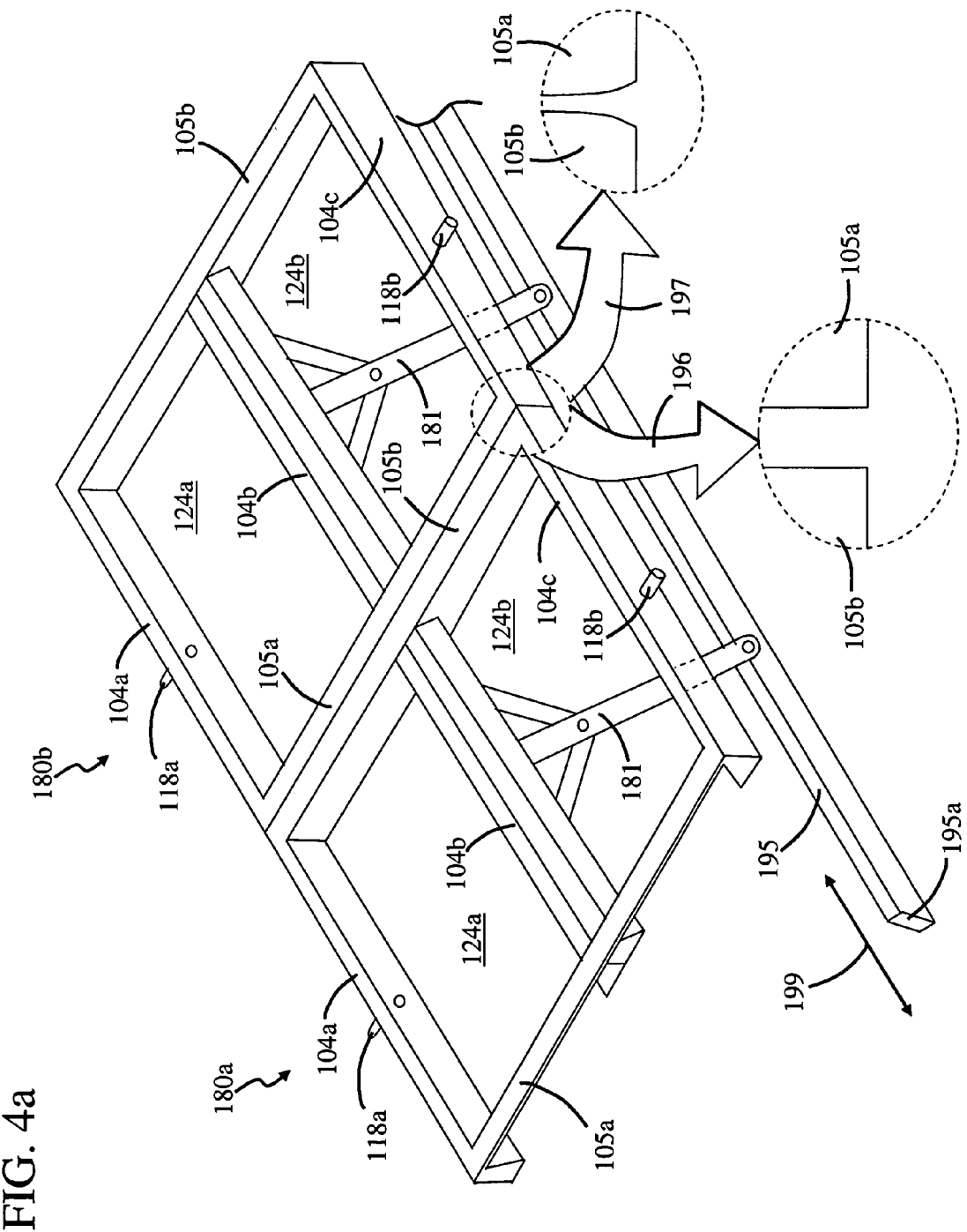

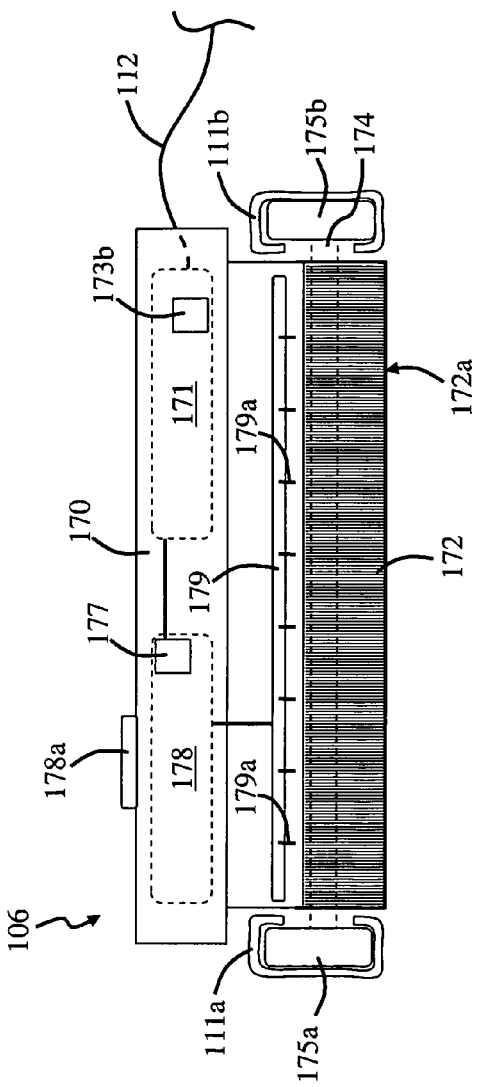
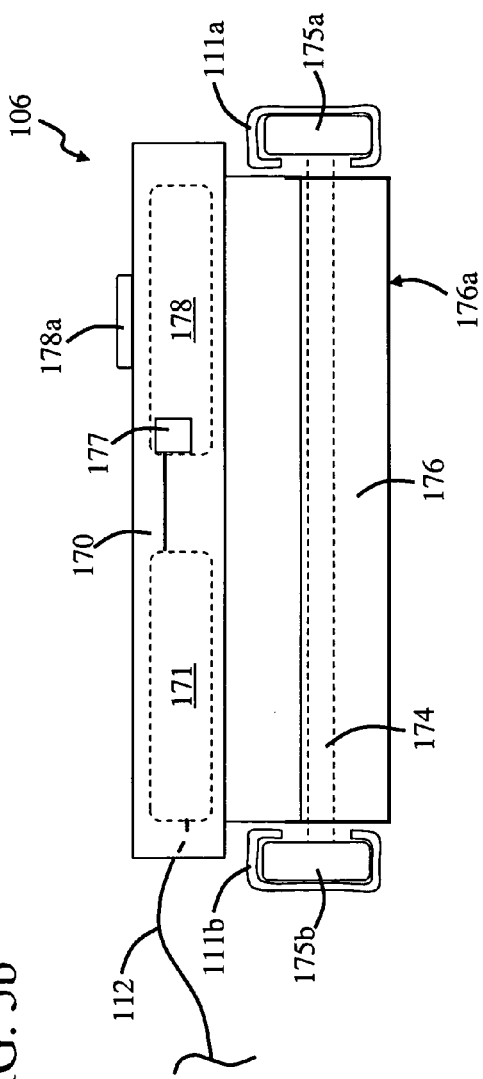
FIG. 5a
FIG. 5b

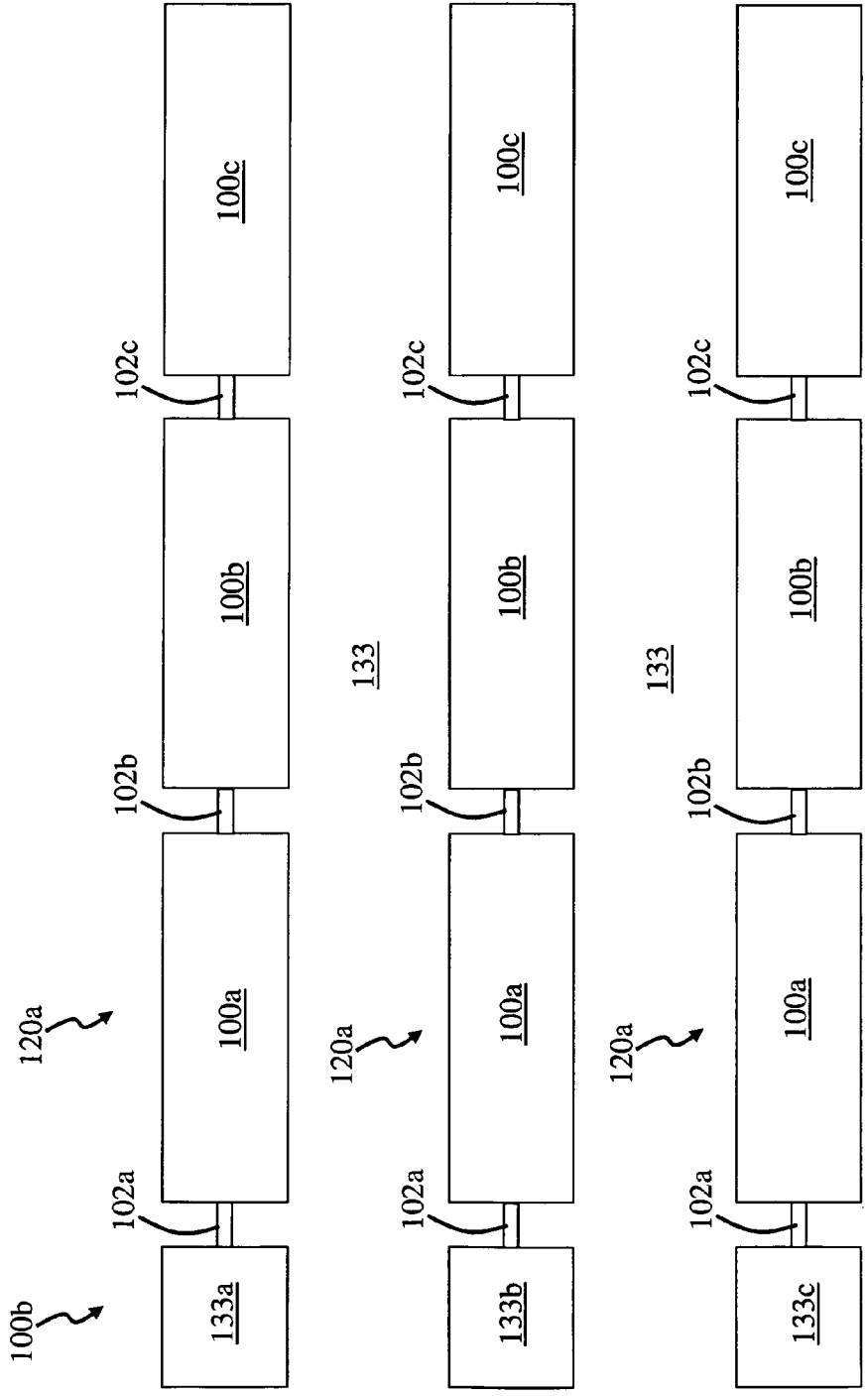

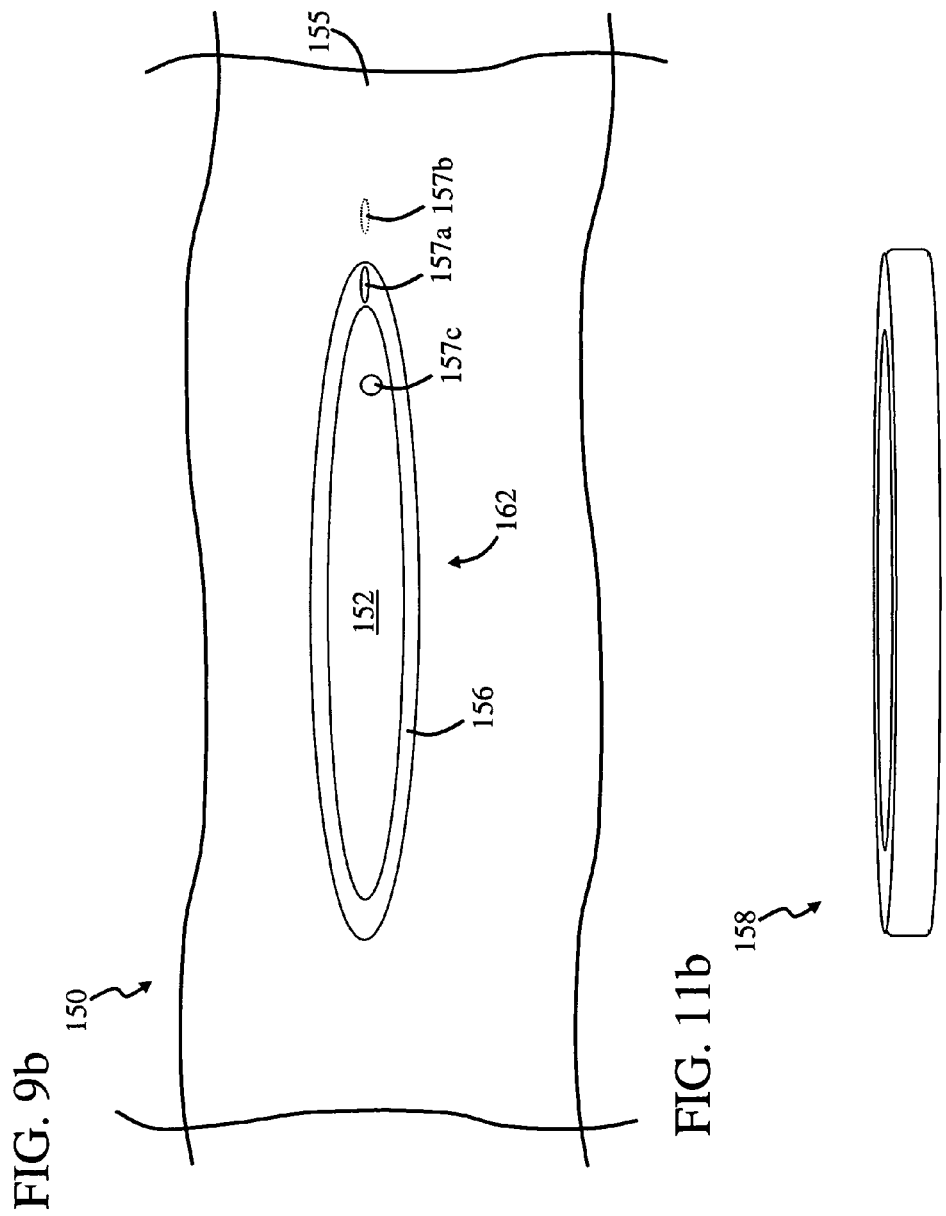

FIG. 14b
FIG. 14c
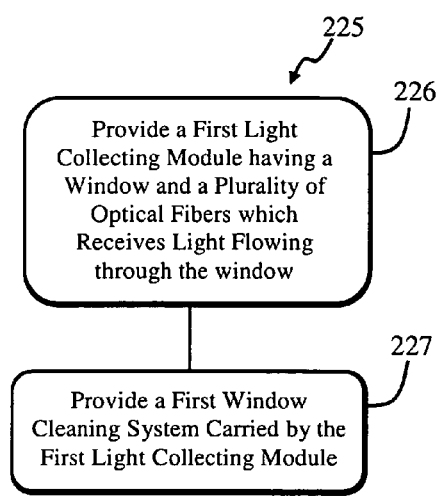
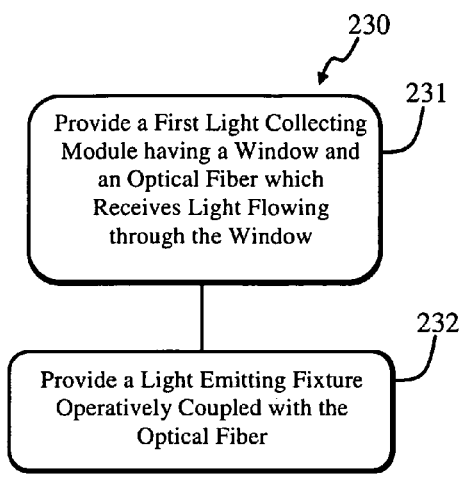

MODULAR LIGHTING SYSTEM

BACKGROUND OF THE INVENTION

1. Field of the Invention

This invention relates to a lighting system which collects light and flows it to a desired location.

2. Description of the Related Art

There are many different types of lighting systems available which collect light, such as sunlight. Some of these lighting systems utilize sunlight by converting it into another form of energy, such as electrical energy, wherein the electrical energy is used to power an electrical device. Other lighting systems utilize sunlight by receiving and transmitting it to a useful location, such as inside a building, wherein it is used for illumination. Examples of lighting systems that utilize sunlight can be found in U.S. Pat. Nos. 3,991,741, 4,249,516, 4,511,755, 5,581,447, 5,709,456, 6,957,650, 6,958,868, 7,130,102 and 7,190,531, as well as in U.S. patent application Ser. No. 20060016448.

However, it is desirable to provide a lighting system that is modular so it can be easily expanded to collect more sunlight. It is also useful to be able to contract the lighting system so it collects less sunlight. The lighting system should also be modular so it can be easily installed and moved from one location to another. Further, the lighting system should be easier to maintain and clean, and it should also be resistant to adverse weather conditions, such as wind and rain.

BRIEF SUMMARY OF THE INVENTION

The present invention provides a light emitting fixture, which includes an electrical light source which emits generated light and an optical fiber with a light emitting end that emits collected light.

The light emitting fixture can include many other features. For example, in some embodiments, a prism is coupled to the light emitting end of the optical fiber. In some embodiments, the light emitting fixture includes a faceplate assembly, wherein the light emitting end of the optical fiber emits collected light from the faceplate assembly. The faceplate assembly can include optically transparent material. A prism can be carried by the faceplate assembly, wherein the light emitting end of the optical fiber emits collected light from the prism. In some embodiments, the light emitting fixture includes a baffle, wherein the light emitting end of the optical fiber emits collected light from the baffle.

The present invention provides a light emitting fixture, which includes an electrical light source which emits generated light and a plurality of optical fibers which emit collected light from light emitting ends of the optical fibers in response to receiving incident light at their corresponding light receiving ends. In some embodiments, the light emitting ends are positioned proximate to the electrical light source, and the light collecting ends are positioned away from the electrical light source.

The light emitting fixture can include many other features. For example, in some embodiments, the light emitting fixture includes a faceplate assembly, wherein the light emitting ends of the optical fibers emit collected light from the faceplate assembly. In some embodiments, the light emitting fixture includes a plurality of prisms carried by the faceplate assembly, wherein the prisms emit collected light from the optical fibers. In some embodiments, the light emitting ends of the optical fibers are spaced apart from each other.

In some embodiments, the light emitting fixture includes a plurality of prisms coupled to corresponding light emitting ends of the optical fibers. In these embodiments, the plurality of prisms are spaced apart from each other.

The present invention provides a light emitting fixture, which includes an electrical light source which emits generated light in response to an electrical signal and an optical fiber with light emitting and light collecting ends, wherein the optical fiber emits collected light from the light emitting end in response to receiving incident light at the light receiving end. In some embodiments, the light emitting end of the optical fiber is positioned proximate to the electrical light source, and the light collecting end of the optical fiber is positioned away from the electrical light source.

The light emitting fixture can include many other features. For example, in some embodiments, the light emitting fixture includes a faceplate assembly, wherein the light emitting end of the optical fiber emits collected light from the faceplate assembly. In some embodiments, the light emitting end of the optical fiber emits collected light from the ceiling. In some embodiments, the light emitting fixture includes a baffle, wherein the light emitting end of the optical fiber emits collected light from the baffle. In some embodiments, the light emitting fixture includes a prism optically coupled with the light emitting end of the optical fiber. In some embodiments, the light emitting fixture includes a light disperser optically coupled with the light emitting end of the optical fiber.

These and other features, aspects, and advantages of the present invention will become better understood with reference to the following drawings and description.

BRIEF DESCRIPTION OF THE DRAWINGS

FIG. 1a is a block diagram of a lighting system, in accordance with the invention.

FIG. 1b is a side view of the lighting system of FIG. 1a installed with a building having a flat roof.

FIG. 1d is a perspective view of an enclosure included with the building of FIG. 1c.

FIG. 1e is a perspective view of a water diverter positioned on the building of FIG. 1c.

FIG. 2a is a perspective view of a light collecting module, in accordance with the invention, included with the lighting systems of FIGS. 1a, 1b and 1c.

FIG. 2b is a cut-away perspective view of the light collecting module of FIG. 2a.

FIG. 2c is a close-up perspective view of the light collecting module of FIG. 2a, with a cleaning system operatively coupled to a power system.

FIG. 2d is a close-up end perspective view of the light collecting module of FIG. 2a with a relay.

FIGS. 2e and 2f are top and side views, respectively, of the light collecting module of FIG. 2a.

FIG. 2g is a perspective view of a frame which can be included with the light collecting module of FIG. 2a.

FIG. 2h is an end view of the light collecting module of FIG. 2a showing an optical fiber bundle extending therethrough.

FIGS. 3b and 3c are side views of the frame of FIG. 3a rotated counterclockwise and clockwise, respectively.

FIG. 3d is a side view of the frame of FIG. 3a.

FIG. 3e is a side view of the frame of FIG. 3a coupled to baffles, in accordance with the invention.

FIG. 4a is a perspective view of the frames of FIG. 3a operatively coupled together with a movement arm, in accordance with the invention.

FIGS. 5a and 5b are opposed side views of the cleaning system of FIGS. 2b and 2c, in accordance with the invention.

FIGS. 6b and 6c are end views of the light collecting system of FIG. 6a.

FIGS. 7b and 7c are side views of stands included with the light collecting system of FIG. 7a.

FIG. 7h is a top view of a number of light collecting modules operatively coupled together and positioned on a building, in accordance with the invention.

FIGS. 8a and 8b are block diagrams of some of the components included with the lighting system of FIG. 1a.

FIGS. 9a and 9b are side and perspective views, respectively, of one embodiment of a light emitting fixture, in accordance with the invention.

FIG. 11b is a perspective view of a toroidal light disperser included with the light emitting fixture of FIG. 11a.

FIGS. 14a, 14b and 14c are block diagrams of a method, in accordance with the invention, of installing a lighting system.

DETAILED DESCRIPTION OF THE INVENTION

Figure 1C:
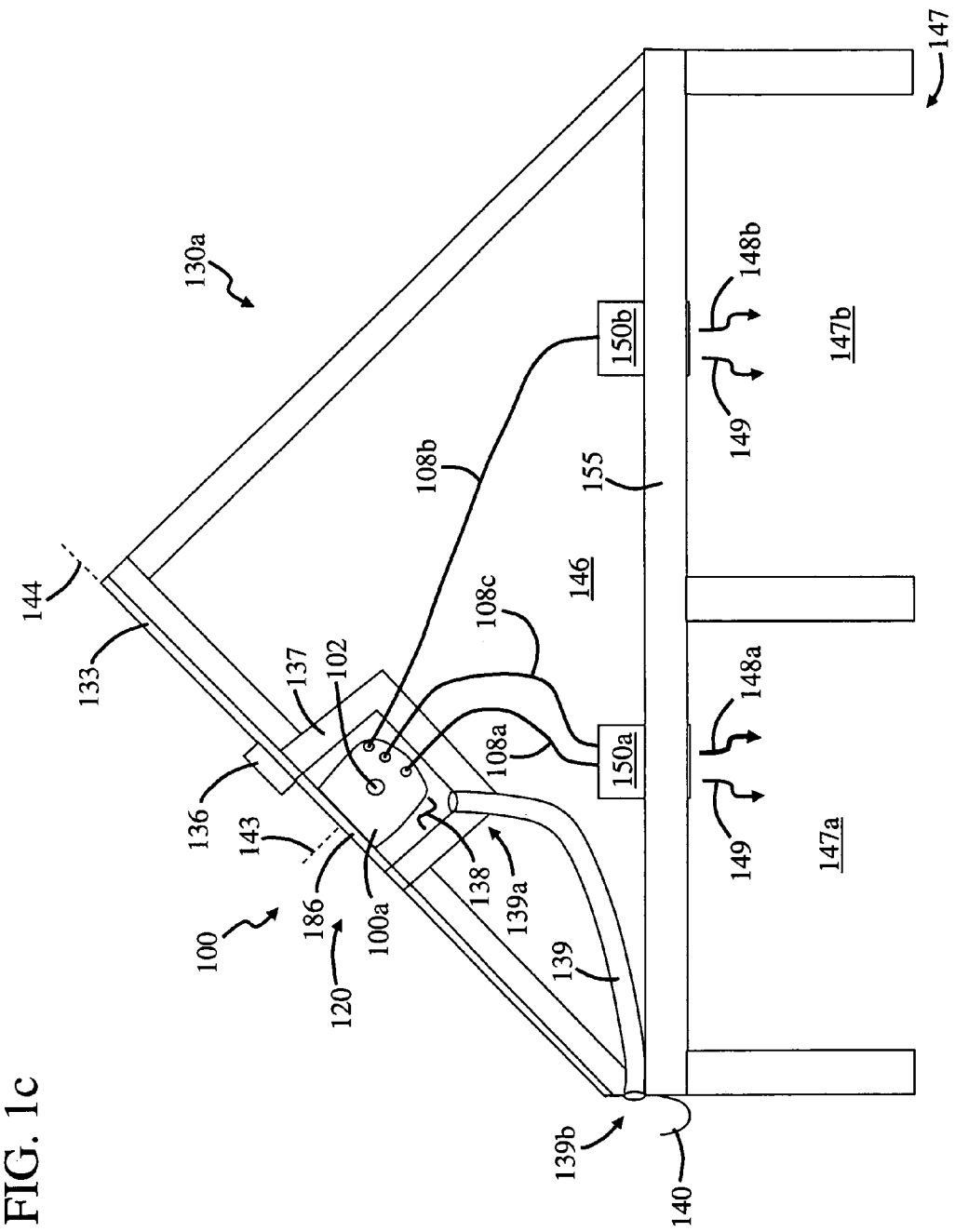
FIG. 1c is a side view of the lighting system of FIG. 1a installed with a building having a slanted roof.

The present invention provides a lighting system which receives light and transmits it to a useful location, such as inside a building, wherein the light is used for illumination. The lighting system is modular so it can be easily expanded and contracted to collect more and less light, respectively. Further, the lighting system is modular so it can be easily installed and moved from one location to another. The lighting system is easier to maintain and clean, and is also resistant to adverse weather conditions, such as wind and rain. The light can be of many different types, such as sunlight. The lighting system can track the sun so it receives sunlight throughout the day.

FIG. 1a is a block diagram of a lighting system 100, in accordance with the invention. In this embodiment, lighting system 100 includes a light collecting system 120 in optical communication with a light emitting fixture 150. Light collecting system 120 can be in optical communication with light emitting fixture 150 in many different ways. In this embodiment, light collecting system 120 is in optical communication with light emitting fixture 150 through an optical fiber bundle 108, wherein bundle 108 includes one or more optical fibers.

In operation, incident light 145 is collected in response to being received by light collecting system 120 at a light collecting surface 110. The collected light is flowed through a light receiving end of optical fiber bundle 108 to light emitting fixture 150, wherein it is flowed outwardly from a light emitting end of bundle 108 as collected light 148. Hence, collected light 148 is the portion of incident light 145 that is collected by light collecting system 120 and flowed through optical fiber bundle 108. Incident light 145 can be of many different types of light, but it is generally includes sunlight. Collected light 148 includes sunlight when incident light 145 includes sunlight.

It should be noted that light collecting surface 110 is typically defined by a window 103 of a light collecting module. Window 103 can be of many different types, such as a plastic and glass plate. In general, window 103 includes a material that is optically transparent to desired wavelengths of incident light 145 so that this light can be collected. If desired, a filtering layer can be positioned proximate to window 103 to filter undesired wavelengths of light, such as infrared. The filtering layer can be, for example, another window positioned proximate to window 103, or a coating layer carried by window 103. In one embodiment, window 103 is a Fresnel lens, several of which are disclosed in U.S. Pat. Nos. 5,151, 826 and 6,282,034. The Fresnel lens can focus incident light 145 as it flows therethrough, and direct it to the optical fiber(s) included with bundle 108.

In some embodiments, light emitting fixture 150 is capable of emitting generated light 149. Light emitting fixture 150 can emit generated light 149 in many different ways, such as with an electrical light source. The electrical light source is positioned proximate to the light emitting end of optical fiber bundle 108, wherein collected light 148 flows through the light emitting end. The electrical light source can be of many different types, such as an incandescent light bulb and light emitting diode. Thus, light emitting fixture 150 is capable of emitting light from the electrical light source and/or optical fiber bundle 108. It should be noted that the light from the electrical light source typically does not include sunlight. In this way, light emitting fixture 150 is capable of emitting light that includes sunlight and light that does not include sunlight. It should be noted that collected light 148 flows through optical fiber bundle 108, but generated light 149 does not.

Hence, the invention provides a lighting system which includes a light collecting module having a window and an optical fiber which receives light flowing through the window. The lighting system also includes a light emitting fixture operatively coupled to the optical fiber, wherein the light emitting fixture includes an electrical light source positioned proximate to a light emitting end of the optical fiber.

FIG. 1b is a side view of lighting system 100 installed with a building 130 having a flat roof, in accordance with the invention. In this embodiment, lighting system 100 includes light collecting system 120 positioned on a roof 133 of building 130. Light collecting system 120 includes light collecting modules 100a and 100b. Light collecting modules 100a and 100b each have windows 103, and an optical fiber receives light flowing through the corresponding window. The optical fibers that receive light from windows 103 of modules 100a and 100b are included in optical fiber bundles 108a and 108b, respectively.

In this embodiment, light collecting modules 100a and 100b are coupled together so they are repeatably rotatable, as a unit, between first and second positions. In one example, windows 103 face the sun in the first position and windows 103 face away from the sun in the second position. In another example, windows 103 face perpendicular (i.e. straight up) to roof 133 in the second position and windows 103 face at a non-perpendicular angle to roof 133 in the first position. Light collecting modules 100a and 100b are coupled together so that module 100a rotates in response to the rotation of module 100b. Further, light collecting modules 100a and 100b are coupled together so that module 100b rotates in response to the rotation of module 100a. Light collecting modules 100a and 100b can be coupled together in many different ways, but here a rotation arm 102 is used.

In this embodiment, lighting system 100 includes light emitting fixtures 150a and 150b optically coupled to light collecting modules 100a and 100b, respectively. Light emitting fixtures 150a and 150b are optically coupled to corresponding light collecting modules 100a and 100b through optical fiber bundles 108a and 108b, respectively. Light emitting fixtures 150a and 150b are carried by a ceiling 155 of building 130 and are used to illuminate an interior 147 of building 130. It should be noted that light emitting fixtures 150a and 150b can illuminate the same room of interior 147, or different rooms.

Optical fiber bundles 108a and 108b can extend through building 130 and between light collecting system 120 and light emitting fixtures 150a and 150b in many different ways. In this embodiment, optical fiber bundles 108a and 108b extend through roof 133 and an attic 146 of building 130. Optical fiber bundles 108a and 108b can extend through roof 133 and attic 146 in many different ways, such as through the air conditioning/heating system duct work typically installed with most buildings. The air conditioning/heating system duct work is installed with a building to flow air therethrough, wherein the air is typically at a controlled temperature. More information regarding how optical fiber bundles 108a and 108b can extend through a building is provided with FIG. 7a.

In another example, an optical fiber bundle 108c extends between light collecting module 100a and light emitting fixture 150a through a parapet 131 and sidewall 135 of building 130. Sidewall 135 extends between roof 133 and ceiling 155, and parapet 131 extends upwardly from roof 133 and sidewall 135. More information regarding how to extend an optical fiber through a building is provided in U.S. Pat. No. 5,581,447. It should be noted that one of optical fiber bundles 108a and 108c can extend between light collecting module 100a and light emitting fixture 150a, or both of optical fiber bundles 108a and 108c can extend between light collecting module 100a and light emitting fixture 150a. In this way, one or more optical fiber bundles extend between a light collecting module and a light emitting fixture.

FIG. 1c is a side view of lighting system 100 installed with a building 130a, in accordance with the invention. In this embodiment, building 130a includes roof 133 through which an enclosure 137 extends, wherein roof 133 is tilted at a non-perpendicular angle. Roof 133 is tilted at a non-perpendicular angle so that it is slanted instead of flat, as in FIG. 1b. Enclosure 137 is shown in more detail in a perspective view of FIG. 1d. Enclosure 137 includes an opening 138 sized and shaped to receive light collecting system 120. It should be noted that, in general, enclosure 137 is sized and shaped to receive a light collecting system having one or more light collecting modules. In the situation in which enclosure 137 receives more than one light collecting module, the light collecting modules can be coupled together so they are repeatably rotatable, as a unit, between first and second positions.

In this embodiment, one light collecting module, denoted as module 100a, is shown as being received by opening 138. A filtering window 186 is positioned proximate to window 103 of light collecting module 100a so that module 100a is enclosed by window 186 and enclosure 137. Filtering window 186 filters undesired wavelengths of light, such as infrared, from incident light 145.

In this embodiment, a water diverter 136 is positioned to divert water around enclosure 137. Water diverter 136 is shown in more detail in a perspective view of FIG. 1e. Water diverter 136 can include many different materials, such as wood, plastic and metal. Water diverter 136 can have many different shapes, such as curved surfaces 136a, to divert the flow of water away from enclosure 137. In this way, water is less likely to flow into opening 138 and be retained by enclosure 137.

In this embodiment, a fluid conduit 139 extends from enclosure 137 and through building 130a. Fluid conduit 139 includes an opening 139a positioned to receive water that does flow through opening 138 so that this water is not retained by enclosure 137. An opposed opening 139b of fluid conduit is positioned away from enclosure 137 so that the water is flowed away from enclosure 137. Opening 139b can be positioned at many different locations. In this embodiment, opening 139b is positioned so that water flowing outwardly therefrom is flowed to a rain gutter 140 of building 130a.

As shown in FIG. 1d, a filtering fluid conduit 141 is coupled to opening 139a of fluid conduit 139, wherein filtering fluid conduit 141 extends through opening 138 of enclosure 137. In this embodiment, filtering fluid conduit 141 includes a plurality of openings 142 extending therethrough to allow water retained by enclosure 137 to flow to fluid conduit 139 through opening 139a. Openings 142 can have many different sizes and shapes. However, openings 142 are typically sized and shaped to allow water to flow through them, while restricting the flow of debris, such as dirt, rocks and leaves. Openings 142 can each be the same size and shape or their sizes and shapes can be different, if desired. Openings 142 are provided so that, in the situation in which one becomes clogged, the water can still flow through other openings 142 that are not clogged. Openings 142 extend around the outer periphery of filtering fluid conduit 141 because debris tends to settle and is more likely to clog openings 142 positioned proximate to enclosure 137 and debris is less likely to clog openings 142 positioned away from enclosure 137. Hence, openings 142 away from enclosure 137 are more likely to remain unclogged and allow water to flow to conduit 139 through opening 139a.

In this embodiment, lighting system 100 includes light emitting fixtures 150a and 150b optically coupled to light collecting module 100a, wherein light emitting fixtures 150a and 150b are carried by ceiling 155. Light emitting fixture 150a is optically coupled to light collecting module 100a through optical fiber bundles 108a and 108c, and light emitting fixture 150b is optically coupled to light collecting module 100a through optical fiber bundle 108b. Hence, two optical fiber bundles optically couple light emitting fixture 150a and light collecting module 100a together, and one optical fiber bundle optically couples light emitting fixture 150b and light collecting module 100a together. In this way, light emitting fixtures 150a and 150b are optically coupled together with a different number of optical fiber bundles.

In general, the amount of collected light emitted by a light emitting fixture increases as the number of optical fiber bundles optically coupled to it increases. Further, the amount of collected light emitted by a light emitting fixture decreases as the number of optical fiber bundles optically coupled to it decreases. Hence, in this embodiment, light emitting fixture 150a emits a larger amount of collected light 148a than light emitting fixture 150b because more optical fiber bundles are optically coupled to it. Further, in this embodiment, light emitting fixture 150b emits a smaller amount of collected light 148b than light emitting fixture 150a because fewer optical fiber bundles are optically coupled to it. In this way, the amount of collected light emitting by a light emitting fixture can be controlled by controlling the number of optical fiber bundles that are optically coupled to it.

Light emitting fixtures 150a and 150b are used to illuminate interior 147 of building 130, wherein interior 147 includes rooms 147a and 147b. In this embodiment, light emitting fixtures 150a and 150b illuminate rooms 147a and 147b, respectively. In this way, lighting system 100 illuminates different rooms of a building instead of the same rooms. Further, light emitting fixture 150a provides more collected light to room 147a than light emitting fixture 150b provides to room 147b because, as mentioned above, light emitting fixture 150a is coupled to more optical fiber bundles than light emitting fixture 150b.

Optical fiber bundles 108a, 108b and 108c can extend between light collecting module 100a and light emitting fixtures 150a and 150b in many different ways. In this embodiment, optical fiber bundles 108a, 108b and 108c extend through enclosure 137 and attic 146. It should be noted that optical fiber bundles 108a, 108b and 108c typically extend through enclosure 137 at a location away from filtering fluid conduit 141 to reduce the likelihood that they will contact water retained by enclosure 137.

FIG. 2a is a perspective view of light collecting module 100a, in accordance with the invention, and FIG. 2b is a cut-away perspective view of light collecting module 100a. FIGS. 2c and 2d are close-up perspective end views of light collecting module 100a, with a cleaning system 106 operatively coupled to a relay 173 (FIG. 2d) and a power system 113 (FIG. 2c) with a power cord 112. Cleaning system 106 can be of many different types, one of which will be discussed in more detail with FIGS. 5a and 5b. FIGS. 2e and 2f are top and side views, respectively, of light collecting module 100a. It should be noted that light collecting modules 100b and 100c discussed herein are typically the same as light collecting module 100a.

In this embodiment, light collecting module 100a includes a light collecting module housing 101 and a frame 123 carried by housing 101, wherein frame 123 is shown in a perspective view in FIG. 2g. Frame 123 includes longitudinal and transverse frame members 104 and 105 which extend longitudinally and transversely, respectively, along housing 101. In this embodiment, longitudinal frame member 104 extends perpendicular to transverse frame member 105. In general, longitudinal frame member 104 extends at a non-zero angle relative to transverse frame member 105.

Longitudinal and transverse frame members 104 and 105 bound frame openings 124, which are sized and shaped to receive window 103. Hence, each window 103 extends between longitudinal frame member 104 and adjacent transverse frame members 105. As mentioned above, window 103 can be a Fresnel lens, and can direct incident light 145 towards an optical fiber 109 included with optical fiber bundle 108 and housed by light collecting module housing 101. Window 103, as well as longitudinal and transverse frame members 104 and 105, define light collecting surface 110 (FIGS. 2a and 2b) through which incident light 145 flows.

In this embodiment, a plurality of optical fibers 109 extend through light collecting module housing 101 (FIG. 2b), wherein each optical fiber 109 is held by an optic fiber holder 107. When window 103 is a Fresnel lens, the lens is positioned so that it directs light at a light receiving end of optical fiber 109. Hence, optical fiber 109 is typically held so that its light receiving end faces upwardly towards window 103.

Optical fiber 109 is shown as being a single optical fiber for illustrative purposes. However, in general, each optical fiber 109 can be one or more optical fibers bundled together. More information regarding optical fibers and optical fiber bundles is provided in U.S. Pat. No. 5,581,447. As shown in FIGS. 2a, 2b and 2e, module 100 includes ten windows 103, so that there are ten optical fibers 109 (FIG. 2e), wherein each optical fiber 109 is optically coupled to a corresponding window 103. In other embodiments, one or more optical fiber bundles are optically coupled with each window, wherein each optical fiber bundle includes one or more optical fibers.

As discussed in more detail above, optical fiber bundle 108 extends to a desired location so that the light received by the each light receiving end of optical fiber 109 flows to the desired location. The desired location can be a building, such as building 130, and the light emitting end of bundle 108 is positioned so that the light illuminates the building, such as building interior 147 (FIG. 1b).

Module housing 101, frame 123 and windows 103 can be hermetically sealed together to restrict the flow of moisture therethrough. The presence of moisture in housing 101 can undesirably affect the ability of the end of optical fiber 109 to receive light. For example, moisture on the light receiving end of optical fiber 109 can undesirably attenuate light incident to it and reduce the amount collected. However, in some situations moisture does undesirably flow into housing 101. Hence, in some embodiments, module housing 101 includes a plurality of drain openings 121 (FIG. 2c) which extend through it to allow the moisture to flow downwardly and out of housing 101.

FIG. 2h is a close-up perspective end view of light collecting module 100, wherein optical fiber bundle 108 extends through light collecting module 101 and is sealed thereto with a seal 119. Seal 119 can be of many different types, such as an O-ring seal. Seal 119 provides a hermetic seal between optical fiber bundle 108 and housing 101 so that water is less likely to flow between them.

Figure 3A:
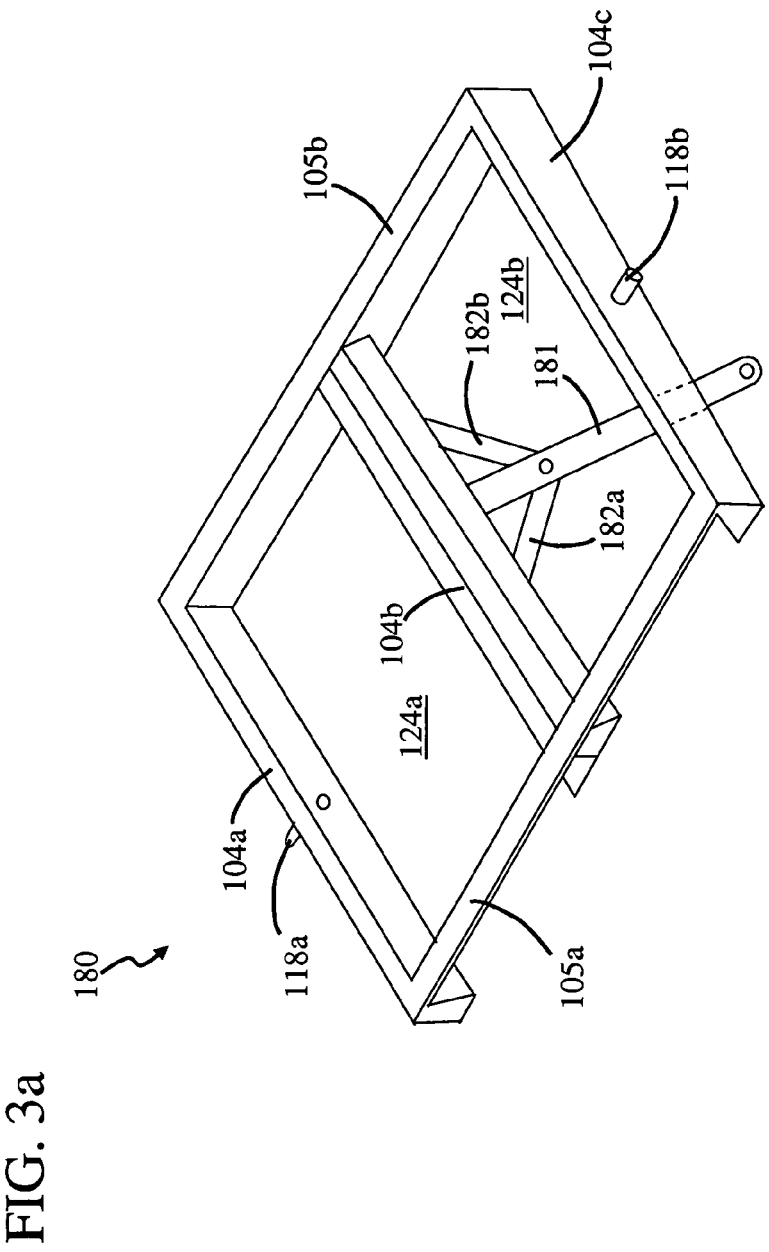
FIG. 3a is a perspective view of a frame which can be used with a light collecting module, in accordance with the invention.

FIG. 3a is a perspective view of a frame 180, in accordance with the invention, which can be used with light collecting module 100a. In this embodiment, frame 180 includes a frame opening 124a bounded by longitudinal frame members 104a and 104b, as well as transverse frame members 105a and 105b. Further, frame 180 includes a frame opening 124b bounded by longitudinal frame members 104b and 104c, as well as transverse frame members 105a and 105b. Frame openings 124a and 124b are sized and shaped to receive windows 103a and 103b, respectively, which are shown in FIGS. 3b, 3c, 3d and 3e.

In this embodiment, frame 180 includes trunnion pins 118a and 118b which extend outwardly from longitudinal frame members 104a and 104c, respectively. Trunnion pins 118a and 118b extend from corresponding longitudinal frame members 104a and 104c and away from frame openings 124a and 124b, respectively. Trunnion pins 118a and 118b allow frame 180 to rotate relative to light collecting module housing 101. Trunnion pins 118a and 118b allow frame 180 to rotate relative to light collecting module housing 101 to change the pitch of windows 103a and 103b. Trunnion pins 118a and 118b allow frame 180 to rotate relative to light collecting module housing 101 and change the pitch of windows 103a and 103b independently of the roll of module housing 101. In this way, the roll and pitch of windows 103a and 103b can be adjusted independently of each other.

Frame 180 can be rotated relative to light collecting module 100 in many different ways, but, in this embodiment, a rotation arm 181 is used. Rotation arm 181 is coupled directly with longitudinal frame member 104b, and indirectly with longitudinal frame member 104b through support arms 182a and 182b. Support arms 182a and 182b extend between rotation arm 181 and longitudinal frame member 104b at an angle relative to arm 181. Support arms 182a and 182b are coupled between a midpoint of rotation arm 181 and longitudinal frame member 104b.

Figure 3D:
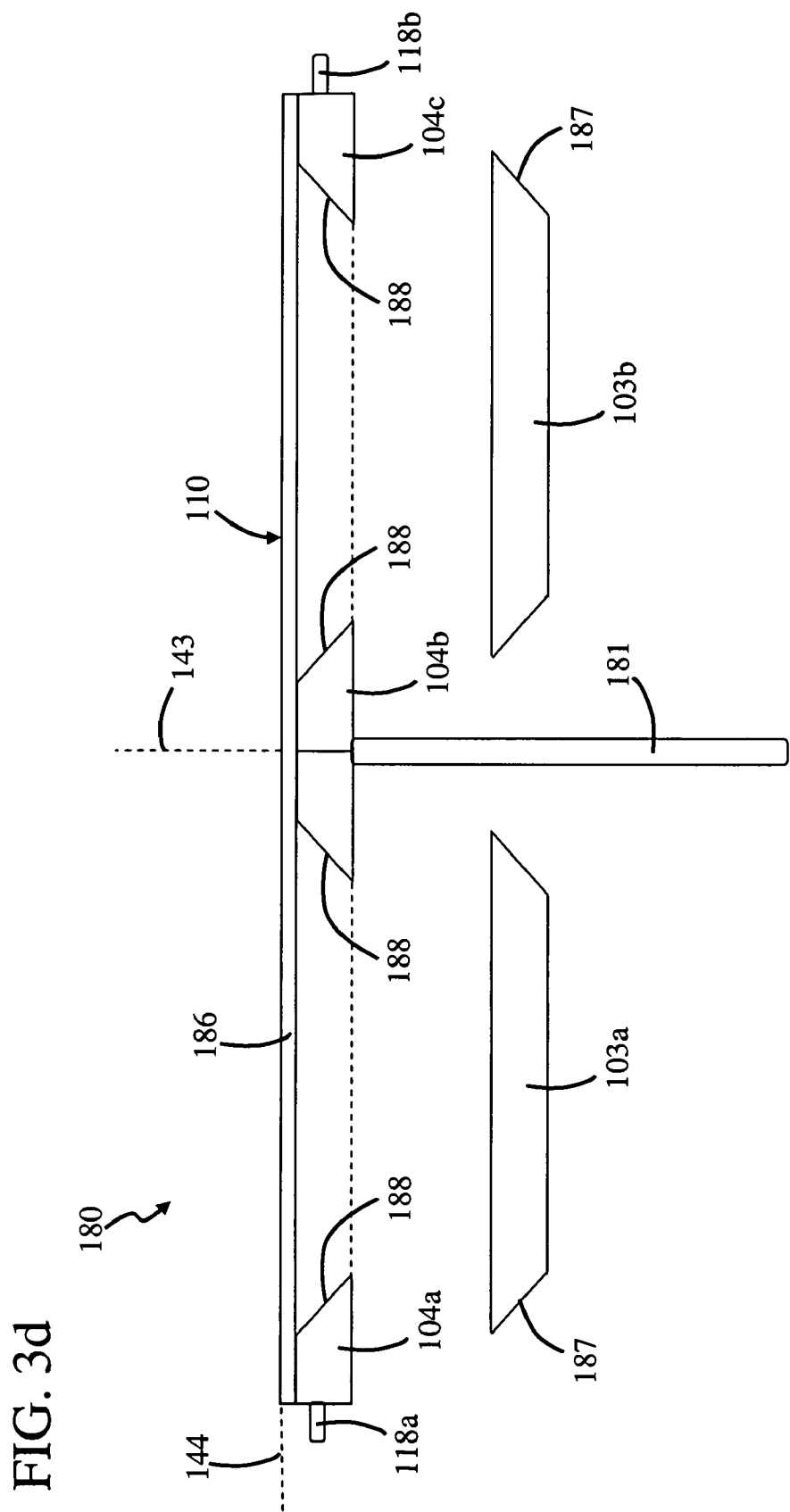

FIGS. 3b and 3c are side views of frame 180, in accordance with the invention, rotated counterclockwise and clockwise, respectively, when looking towards trunnion pin 118a. In this embodiment, windows 103a and 103b are positioned so they extend through openings 124a and 124b, respectively, and are carried by frame 180. Windows 103a and 103b can be carried by frame 180 in many different ways. In this embodiment, and as shown in FIG. 3d, window 103a includes opposed tapered sides 187 which are sized and shaped to be received by corresponding tapered sides 188 of transverse frame members 104a and 104b. Further, window 103b includes opposed tapered sides 187 which are sized and shaped to be received by corresponding tapered sides 188 of transverse frame members 104b and 104c. In this way, windows 103a and 103b are slidingly engaged with frame 180.

In FIG. 3b, rotation arm 181 is rotated counterclockwise so that windows 103a and 103b are rotated counterclockwise in response. In FIG. 3c, rotation arm 181 is rotated clockwise so that windows 103a and 103b are rotated clockwise in response. Windows 103a and 103b are rotated in response to the rotation of arm 181 to provide them with a desired pitch relative to light collecting module housing 101. As discussed above, light collecting module housing 101 is rotated to provide windows 103a and 103b with a desired roll. In this way, the pitch and roll of windows 103a and 103b is controlled. The pitch and roll of windows 103a and 103b is controlled so that they can face a desired direction, such as towards the sun.

In FIG. 3e, light baffles 184a and 184b are coupled to frame 180. Light baffles 184a and 184b can be coupled to frame 180 in many different ways. In this embodiment, light baffle 184a includes opposed tapered sides 189 which are sized and shaped to be received by corresponding tapered sides 188 of transverse frame members 104a and 104b. Further, light baffle 184b includes opposed tapered sides 189 which are sized and shaped to be received by corresponding tapered sides 188 of transverse frame members 104b and 104c. In this way, light baffles 184a and 184b are slidingly engaged with frame 180. In this embodiment, cushion members 183 are positioned between the tapered sides of light baffle 184a and 184b and tapered sides 188. Cushion members 183 allow a certain amount of play between light baffles 184a and 184b and transverse frame members 104a, 104b and 104c in response to rotating arm 181 clockwise and counterclockwise, as described above.

In this embodiment, light baffles 184a and 184b are coupled to optical fiber holders 107a and 107b, respectively. Light baffles 184a and 184b can be coupled to corresponding optical fiber holders 107a and 107b in many different ways. In this embodiment, light baffles 184a and 184b are coupled to corresponding optical fiber holders 107a and 107b using an adhesive. In other embodiments, a fastener, such as a hose clamp, is used to couple light baffles 184a and 184b to corresponding optical fiber holders 107a and 107b.

In this embodiment, optical fibers 109a and 109b are coupled to optical fiber holders 107a and 107b, respectively. Optical fibers 109a and 109b can be coupled to corresponding optical fiber holders 107a and 107b in many different ways. In this embodiment, optical fibers 109a and 109b are coupled to corresponding optical fiber holders 107a and 107b using an adhesive.

It should be noted that optical fibers 109a and 109b, optical fiber holders 107a and 107b and light baffles 184a and 184b rotate in response to the rotation of arm 181. Optical fibers 109a and 109b, optical fiber holders 107a and 107b and light baffles 184a and 184b rotate relative to light collecting module housing 101 in response to the rotation of arm 181. Further, optical fibers 109a and 109b, optical fiber holders 107a and 107b and light baffles 184a and 184b rotate in response to the rotation of frame 180.

As indicated by an indication arrow 169, light baffle 184a can be coupled with optical fiber 109a through optical fiber holder 107 and a light conduit 185. In this embodiment, light conduit 185 is positioned so that light flows from baffle 184a through light conduit 185 and into optical fiber 109a. Light conduit 185 can include many different materials, such as metal. However, the material included with light conduit 185 is typically reflective so that it reflects light received from light baffle 184 into optical fiber 109a. Light conduit 185 can be of many different shapes such as cylindrical and rectangular. However, the shape of light conduit 185 is typically chosen so that it facilitates being coupled with light baffle 184a and optical fiber holder 107. In one embodiment, light conduit 185 is a piece of sheet metal rolled into a cylinder. Light conduit 185 is useful to reduce the amount of heat proximate to optical fiber 109a.

FIG. 4a is a perspective view of frames 180a and 180b operatively coupled together with a movement arm 195, in accordance with the invention. It should be noted that frames 180a and 180b are the same as frame 180 and they are carried by light collecting module housing 101, but housing 101 is not shown here for simplicity. In this embodiment, frames 180a and 180b are positioned adjacent to each other so that longitudinal frame member 105b of frame 180a is adjacent to longitudinal frame member 105a of frame 180b. Further, movement arm 195 is coupled to rotation arms 181 of frames 180a and 180b so that frames 180a and 180b rotate in response to the linear motion of movement arm 195. The linear motion of movement arm 195 is indicated by a direction arrow 199, and the rotation of frames 180a and 180b is described in more detail above with FIGS. 3b and 3c.

Frames 180a and 180b rotate as shown in FIG. 3b when an end 195a of movement arm 195 is moved away from frames 180a and 180b. Further, frames 180a and 180b rotate as shown in FIG. 3c when end 195a of movement arm 195 is moved towards frames 180a and 180b. End 195a of movement arm 195 can be moved in many different ways, one of which will be discussed in more detail with FIG. 7a below.

It should be noted that transverse frame member 105b of frame 180a and transverse frame member 105a of frame 180b can be spaced apart from each other to allow them to rotate relative to each other, as indicated by an indication arrow 196.

Further, in some embodiments, the portion of transverse frame member 105*b* of frame 180*a* that faces transverse frame member 105*a* of frame 180*b* can be shaped, such as curved, to allow members 105*a* and 105*b* to rotate against each other, as indicated by an indication arrow 197.

Figure 4B:
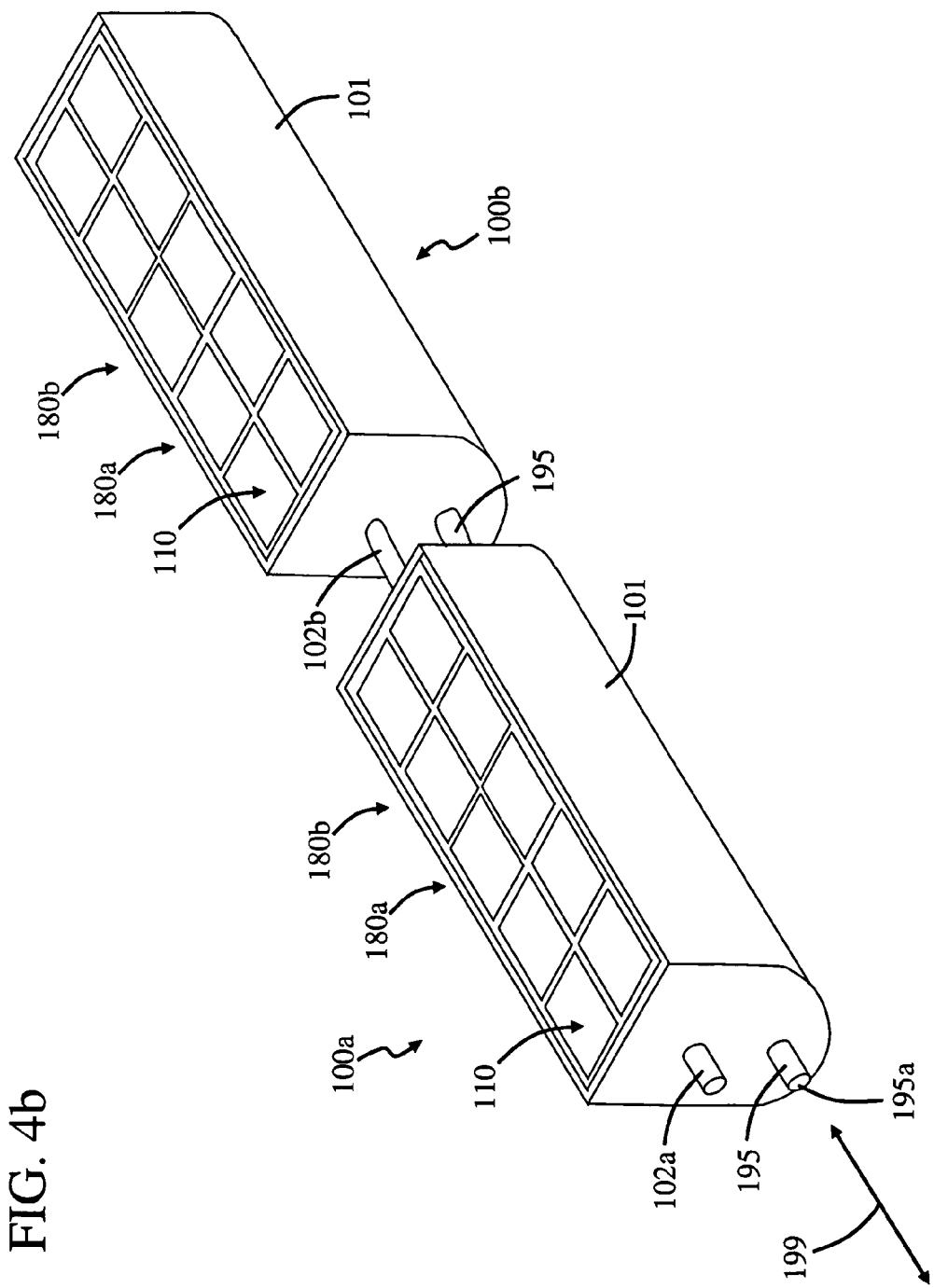
FIG. 4b is a perspective view of two light collecting modules operatively coupled together with a rotation arm, in accordance with the invention.

FIG. 4*b* is a perspective view of light collecting modules 100*a* and 100*b* operatively coupled together with a rotation arm 102*b*. In this embodiment, light collecting modules 100*a* and 100*b* each include light collecting module housings 101 which carry frames 180*a* and 180*b*. In accordance with the invention, frames 180*a* and 180*b* of module 100*a* and operatively coupled to frames 180*a* and 180*b* of module 100*b*. In this way, frames 180*a* and 180*b* of module 100*b* rotate in response to the rotation of frames 180*a* and 180*b* of module 100*a*. Frames 180*a* and 180*b* of module 100*a* can be operatively coupled to frames 180*a* and 180*b* of module 100*b* in many different ways. In this embodiment, movement arm 195 extends through light collecting module housings 101 of modules 100*a* and 100*b*. Further, movement arm 195 extends between light collecting module housings 101 of modules 100*a* and 100*b*.

Movement arm 195 moves through light collecting module housings 101 of modules 100*a* and 100*b* in response to the movement of end 195*a* in direction 199. Frames 180*a* and 180*b* of modules 100*a* and 100*b* rotate as shown in FIG. 3*b* when end 195*a* of movement arm 195 is moved away from modules 100*a* and 100*b*. Further, frames 180*a* and 180*b* of modules 100*a* and 100*b* rotate as shown in FIG. 3*c* when end 195*a* of movement arm 195 is moved towards modules 100*a* and 100*b*.

Figure 8A:
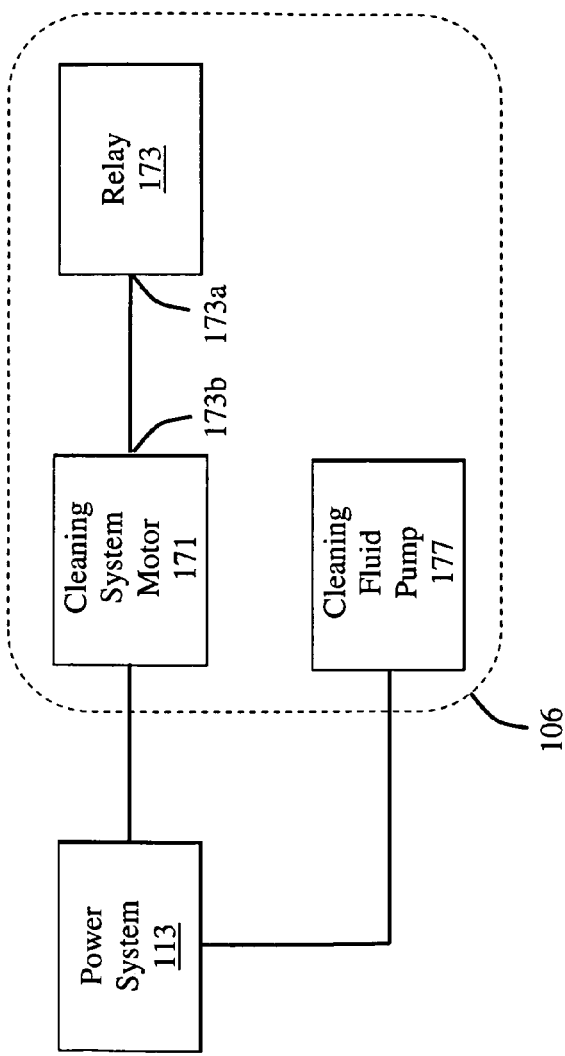
Figure 8B:
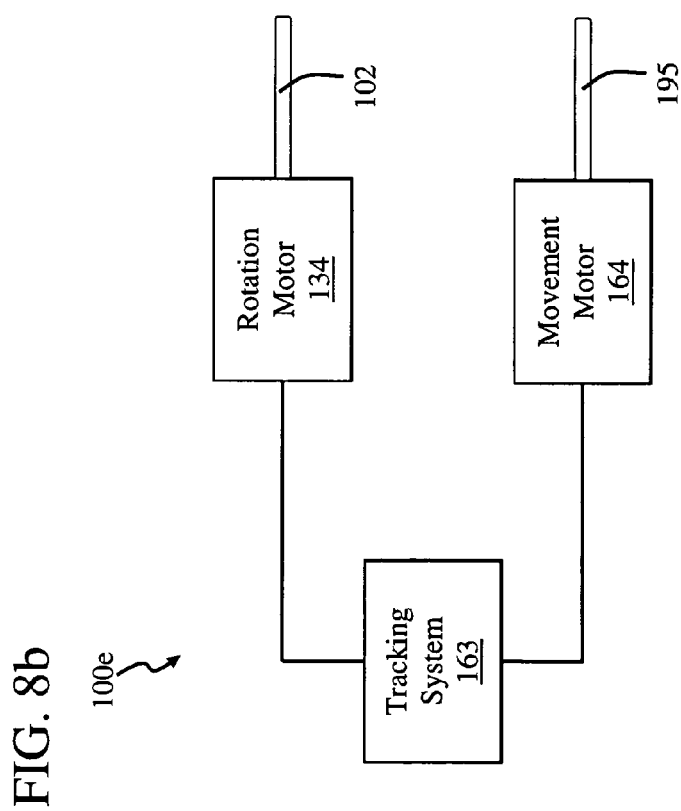

FIGS. 5*a* and 5*b* are side views of cleaning system 106, in accordance with the invention. Cleaning system 106 removes debris from light collecting surface 110 so that light incident upon it is more likely to be collected by lighting system 100. In particular, cleaning system 106 removes debris from light collecting surface 110 so that light incident upon it is more likely to be received by the light receiving end of optical fiber 109. FIGS. 8*a* and 8*b* are block diagrams of some of the components included with lighting system 100.

In this embodiment, cleaning system 106 includes a cleaning system housing 170 which houses a cleaning system motor 171. Cleaning system motor 171 can be of many different types, such as an electric motor. There are many different types of electrical motors that can be used as motor 171, such as those disclosed in U.S. Pat. No. 4,438,590. Motors that can be used are provided by many different manufacturers, such as CMACM Technologies of Sheridan, Mass. These manufacturers provide many different types of motors, such as twelve volt electric motors. Electric motors that can be used or modified for use in accordance with the invention are often included in toys, such as toy cars.

Cleaning system 106 includes an axle 174 with wheels 175*a* and 175*b* attached to its opposed ends. Axle 174 is operatively coupled to motor 171 in a well-known manner so that wheels 175*a* and 175*b* rotate in response to the operation of motor 171. In this embodiment, wheels 175*a* and 175*b* are carried by guide rails 111*a* and 111*b*, respectively, wherein guide rails 111*a* and 111*b* are embodied as c-rails.

In this embodiment, cleaning system 106 includes a brush 172 carried by cleaning system housing 170. Brush 172 can be of many different types of brushes, such as a bristle brush. Cleaning system 106 includes a blade 176 carried by cleaning system housing 170. Blade 176 can be of many different types of blades, such as a rubber blade. Rubber blades are often referred to as a squeegee. Brush 172 and blade 176 are positioned so that one follows the other in response to the rotation of wheels 175*a* and 175*b*. For example, when wheels 175*a* and 175*b* rotate in one direction, blade 176 follows brush 172. Further, when wheels 175*a* and 175*b* rotate in an opposed direction, brush 172 follows blade 176.

In this embodiment, cleaning system 106 includes a fluid reservoir 178 which holds cleaning fluid. The cleaning fluid can be flowed to light collecting surface 110 through a fluid conduit 179 and nozzles 179*a*. The cleaning fluid can be flowed in many different ways, such as by using a cleaning fluid pump 177 operatively coupled to cleaning system motor 171. In this way, brush 172 uses the cleaning fluid to clean light collecting surface 110. Cleaning fluid can be flowed into fluid reservoir 178 by removing a reservoir cap 178*a*, wherein reservoir cap 178*a* is used to seal fluid reservoir 178.

In operation, cleaning system motor 171 receives power from motor 113 through power cord 112. In response, cleaning system motor 171 drives axle 174 so that wheels 175*a* and 175*b* rotate in one direction. Brush 172 and blade 176, as well as cleaning system housing 170, move along light collecting surface 110. An edge 172*a* of brush 172 engages light collecting surface 110 to remove debris therefrom. Further, an edge 176*a* of blade 176 engages light collecting surface 110 to remove moisture therefrom. When cleaning system housing 170 reaches an end of light collecting surface 110, a relay contact 173*b* engages a relay contact 173*a* of relay 173 (FIG. 2*d*). In response to relay contacts 173*a* and 173*b* engaging each other, cleaning system motor 171 drives axle 174 so that wheels 175*a* and 175*b* rotate in an opposed direction.

If desired, cleaning fluid stored in fluid reservoir 171 is flowed to light collecting surface 110 through fluid conduit 179 and nozzles 179*a*. The cleaning fluid stored in fluid reservoir 171 is flowed through fluid conduit 179 and nozzles 179*a* in response to the operation of cleaning fluid pump 177. Cleaning fluid pump 177 flows the cleaning fluid in response to an indication from cleaning system motor 171.

Figure 6A:
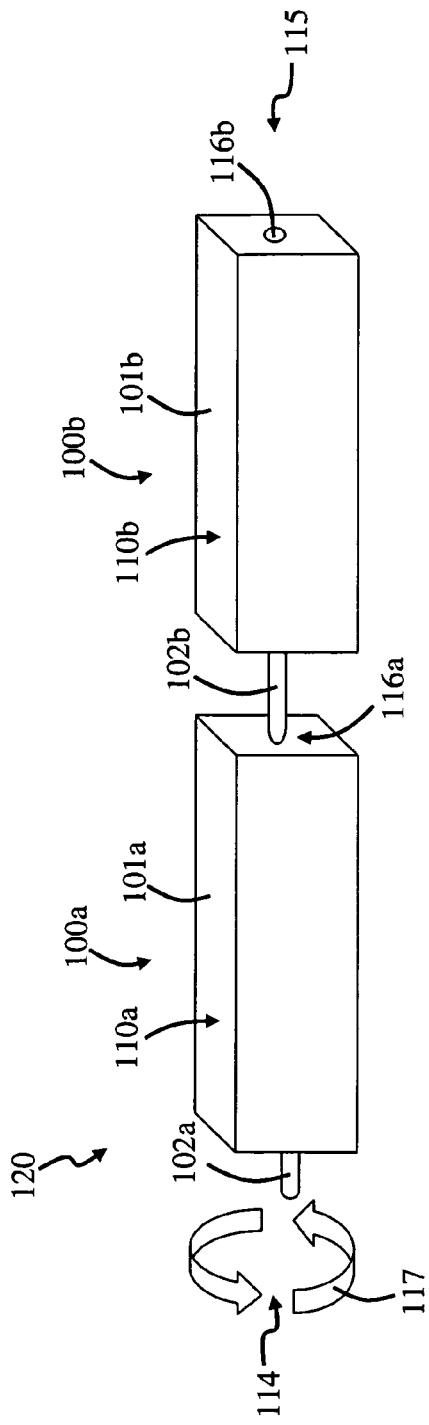
FIG. 6a is a perspective view of a light collecting system, in accordance with the invention, which includes two light collecting modules coupled together.
Figure 6B:
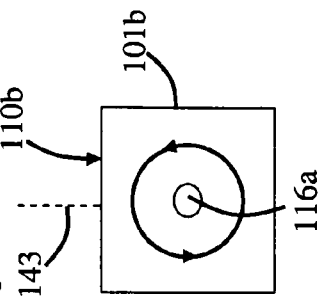
Figure 6C:
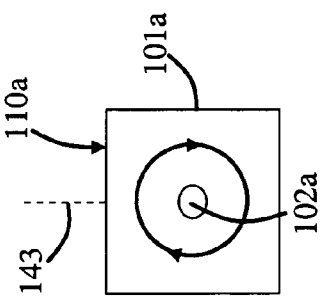

FIG. 6*a* is a perspective view of light collecting system 120, in accordance with the invention, wherein light collecting system 120 includes two light collecting modules coupled together. FIGS. 6*b* and 6*c* are end views of light collecting system 120 looking in directions 114 and 115, respectively, of FIG. 6*a*. The two light collecting modules are denoted as light collecting modules 100*a* and 100*b* and are the same as light collecting module 100 discussed above. In general, light collecting system 120 can include one or more light collecting modules, but only two are shown here for illustrative purposes. An example of a lighting system which includes a light collecting system having three light collecting modules is discussed with FIG. 7*d*.

In this embodiment, light collecting modules 100*a* and 100*b* are coupled together so they are repeatably rotatable, as a unit, between first and second positions. Light collecting modules 100*a* and 100*b* can be coupled together in many different ways. In general, light collecting modules 100*a* and 100*b* are coupled together so they rotate in response to a rotational force applied to at least one of them in a direction 117. Light collecting modules 100*a* and 100*b* are coupled together so that a rotational force applied to one is translated to the other. Hence, light collecting module 100*a* rotates in response to a rotational force applied to light collecting module 100*b*, and light collecting module 100*b* rotates in response to a rotational force applied to light collecting module 100*a*.

In one position, light collecting surfaces 110 of light collecting modules 100*a* and 100*b* are perpendicular to a vertically extending reference line 139 and, in another position, light collecting system surfaces 110 of light collecting modules 100*a* and 100*b* are at a non-perpendicular angle relative to reference line 139.

In this embodiment, light collecting modules 100a and 100b are coupled together with an arm 102b. Arm 102b can be of many different types, such as a shaft. The shaft can be of many different types, such as a threaded arm and dowel. An example of a threaded arm is a bolt shaft. A dowel is a pin, which extends between two adjacent pieces to restrict the amount of slippage between the pieces when they rotate. Dowels are typically cylindrical in shape, but they can have other shapes, such as rectangular. Arm 102b can also be a turnbuckle, such as those disclosed in U.S. Pat. Nos. 5,702,196 and 6,902,341.

In this embodiment, arm 102b of light collecting module 100a is received by an opening 116 of light collecting module 100b so that modules 100a and 100b are coupled together. When light collecting modules 100a and 100b are coupled together, they rotate together as indicated by direction arrow 117. For example, light collecting module 100b rotates in response to the rotation of light collecting module 100a, and light collecting module 100a rotates in response to the rotation of light collecting module 100b.

Figure 7A:
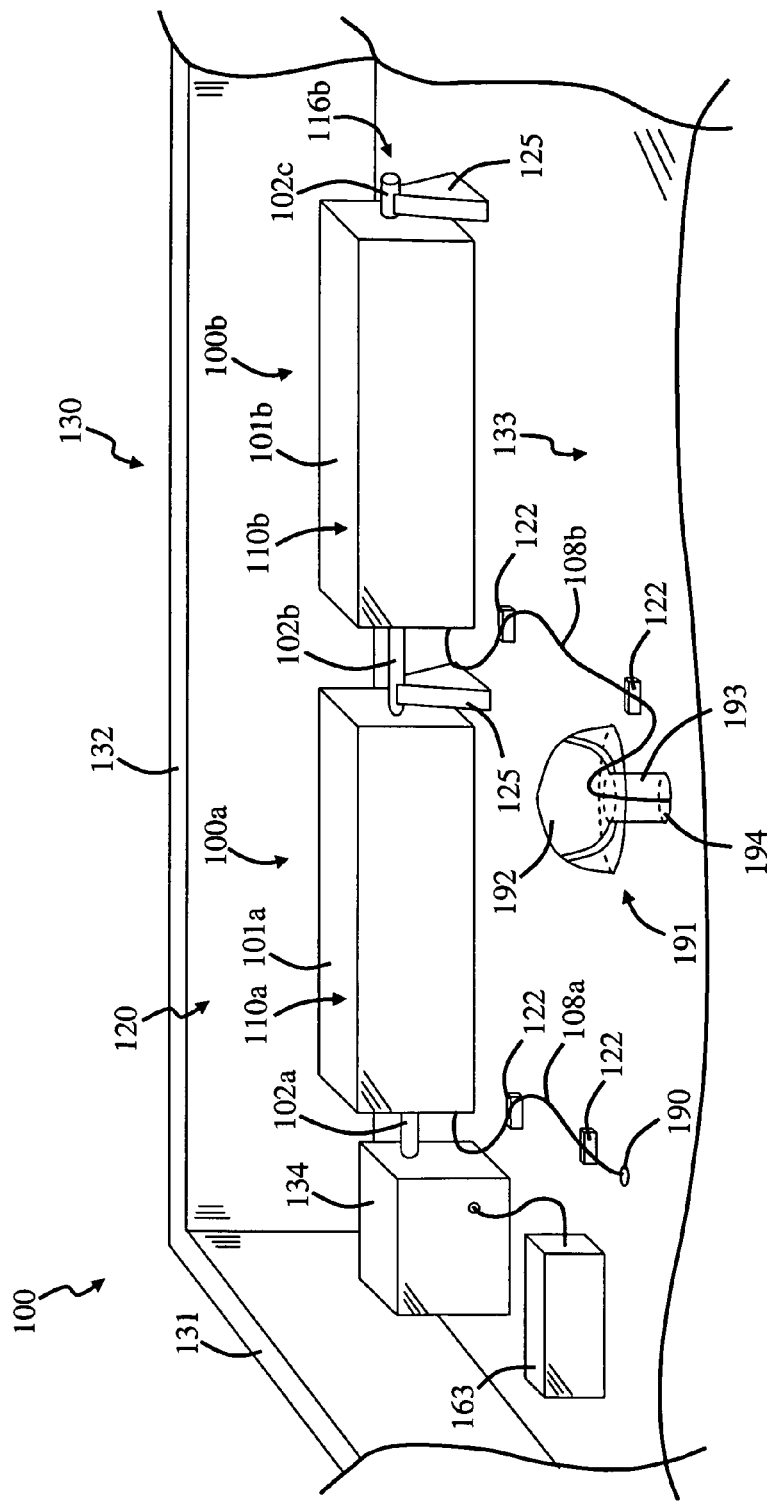
FIG. 7a is a perspective view of another embodiment of a light collecting system, in accordance with the invention.

FIG. 7a is a perspective view of lighting system 100, in accordance with the invention, positioned on building 130. In this embodiment, lighting system 100 includes light collecting system 120 having light collecting modules 100a and 100b. As mentioned above with FIG. 1b, building 130 includes roof 133 with parapets 131 and 132 extending upwardly therefrom, wherein light collecting modules 100a and 100b are carried by roof 133. In this embodiment, light collecting modules 100a and 100b have a low profile so they extend upwardly from roof 133, but terminate below parapets 131 and 132. Light collecting modules 100a and 100b do not extend above parapets 131 and 132 so that parapets 131 and 132 protect light collecting modules 100a and 100b from the elements, such as wind, rain and debris.

In this embodiment, light collecting system 120a includes a rotation motor 134 which is operatively coupled to light collecting modules 100a and 100b. In particular, rotation motor 134 is operatively coupled to light collecting module 100a, and light collecting module 100b is operatively coupled to rotation motor 134 through light collecting module 100a.

Rotation motor 134 is operatively coupled to light collecting modules 100a and 100b so that light collecting modules 100a and 100b rotate in response to the operation of rotation motor 134. For example, rotation motor 134 can rotate light collecting modules 100a and 100b as indicated by direction arrow 117 of FIG. 6a to adjust the roll of windows 103. It is typically desirable to rotate light collecting modules 100a and 100b so that their light collecting surfaces 110 face the sun. In this way, light collecting modules 100a and 100b can be rotated so that they receive a desired amount of sunlight. It should be noted that the longitudinal direction of light collecting modules generally extends East and West so that light collecting modules 100a and 100b can be rotated so that light collecting surface 110 faces the sun.

The operation of rotation motor 134 can be controlled in many different ways. In this embodiment, a tracking system 163 is operatively coupled to rotation motor 134, wherein tracking system 163 determines the amount that rotation motor 134 should rotate modules 100a and 100b so that the desired amount of sunlight is received by light collecting surfaces 110 of modules 100a and 100b. In this way, the roll of windows 103 is adjusted in response to the operation of tracking system 163. In operation, tracking system 163 provides a tracking signal to rotation motor 134 and, in response, light collecting modules 100a and 100b are rotated by the desired amount.

Tracking system 163 can be of many different types, such as those that include photodetectors to determine the position of the Sun as a function of time. More information regarding tracking systems that can be included with light collecting system 120 can be found in U.S. Pat. Nos. 6,037,535, 5,169,456, 4,968,355 and 4,821,705, the contents of all of which are incorporated herein by reference. FIG. 8b is a block diagram of some of these components included with lighting system 100.

If desired, one or more optical fiber cleats can be positioned to hold the optical fiber bundles a distance above roof 133. In this way, the optical fiber bundles are held away from any water and/or debris that may accumulate on roof 133. In this embodiment, cleats 122 are positioned between roof 133 and optical fiber bundle 108a. Further, optical fiber bundle 108a extends through an opening 190, which extends through roof 133. It should be noted that the optical fiber bundle can extend through roof 133 in many other ways. For example, a flow diverter 191 can be positioned over an opening, such as an opening 194. There are many different types of flow diverters that can be used, but, in general, the flow diverter restricts the amount of moisture that can flow through opening 194. In this embodiment, flow diverter 191 includes a head 192 carried by a stand 193, wherein stand 193 extends upwardly from opening 194. Optical fiber bundle 108b extends from roof 133 upwardly and between head 192 and stand 193 and through opening 194. Stand 193 restricts water on roof 133 from flowing through opening 194. Further, head 192 restricts water falling towards roof 133 from flowing through opening 194.

In this embodiment, light collecting modules 100a and 100b are carried above roof 133 with a stand 125. In this way, light collecting modules 100a and 100b can rotate without engaging roof 133. Stand 125 can have many different configurations, several of which will be discussed in more detail presently.

Figure 7B:
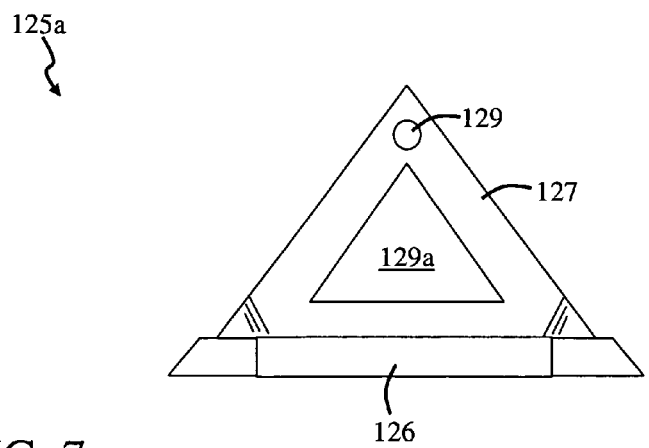

FIG. 7b is a side view of a stand 125a which includes a base 126 which carries an upwardly extending triangular support arm 127. A stand opening 129 extends through the upper portion of support arm 127 and is sized and shaped to receive arm 102. Further, support arm 127 includes a stand opening 129a sized and shaped so that movement arm 195 can extend therethrough, as shown in FIG. 7d.

Figure 7C:
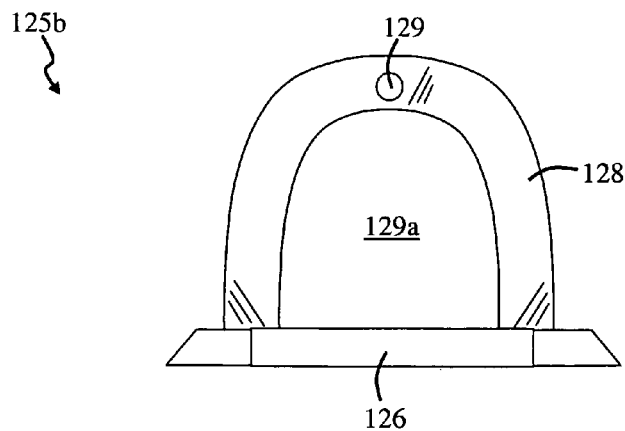

FIG. 7c is a side view of a stand 125b which includes base 126 which carries an upwardly extending curved support arm 128. Stand opening 129 extends through the upper portion of support arm 128 and is sized and shaped to receive arm 102. Further, support arm 128 includes stand opening 129a sized and shaped so that movement arm 195 can extend therethrough, as shown in FIG. 7d. Stands 125a and 125b are dimensioned to allow light collecting module to rotate in direction 117, as discussed in more detail above.

Figure 7D:
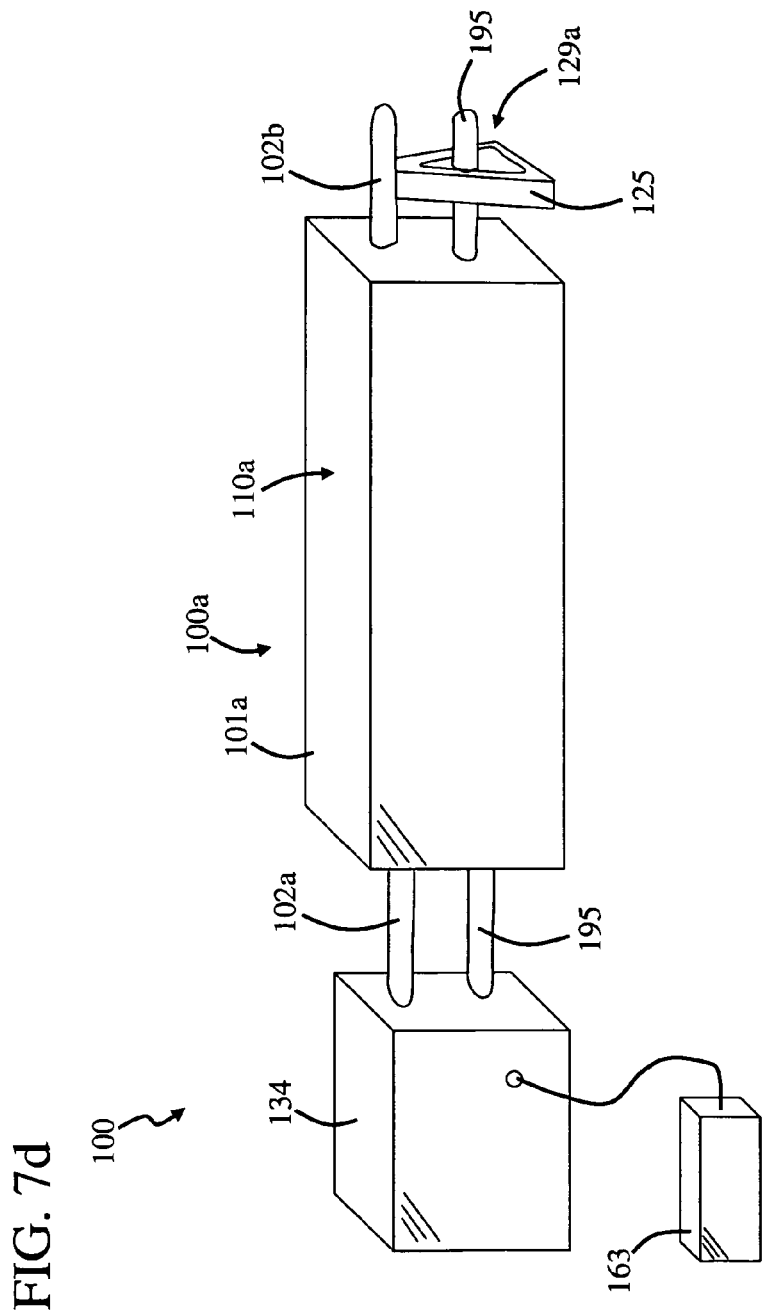
FIG. 7d is a perspective view of another embodiment of a light collecting system, in accordance with the invention.

FIG. 7d is a perspective view of another embodiment of lighting system 100, in accordance with the invention. In this embodiment, rotation motor 134 is coupled to light collecting module 100a with rotation arm 102a. Further, movement arm 195 extends between light collecting module 100a and rotation motor 134. Rotation motor 134 controls the rotation of rotation arm 102a, as well as the movement of movement arm 195 in direction 199. In this way, rotation motor 134 provides rotational movement, as well as linear movement. Tracking system 163 is operatively coupled to rotation motor 134 and controls the operation thereof.

Figure 7F:
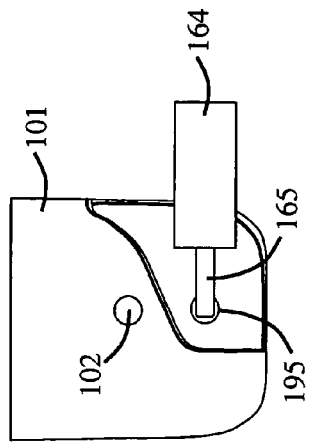
FIG. 7f is a cut-away end view of the light collecting module housing of FIG. 7e.
Figure 7E:
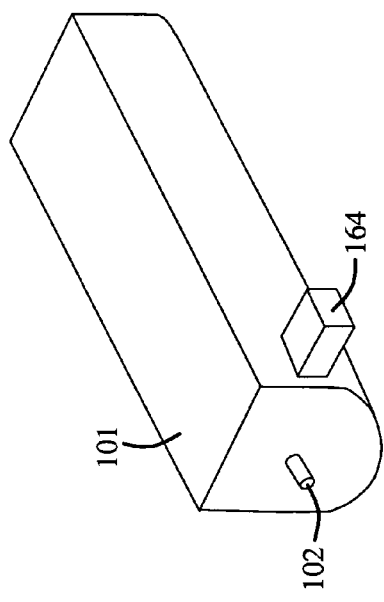
FIG. 7e is a perspective view of a light collecting module housing carrying a movement motor, in accordance with the invention.

FIG. 7e is a perspective view of light collecting module housing 101 carrying a movement motor 164, in accordance with the invention. FIG. 7f is a cut-away end view of the light collecting module housing of FIG. 7e. In this embodiment, rotation arm 102 extends from light collecting module housing 101 to rotation motor 134 (not shown) and movement arm 195 is operatively coupled to movement motor 164. Movement arm 195 and movement motor 164 can be operatively coupled together in many different ways. In this embodiment, an arm 165 extends between movement motor 164 and movement arm 195. Movement arm 195 moves in direction 199 in response to the operation of movement motor 164. In this way, movement motor 164 controls the pitch of windows 103 and rotation motor 134 controls the roll of windows 103. It should be noted that movement motor 164 can be positioned at many other locations, one of which will be discussed in more detail presently.

Figure 7G:
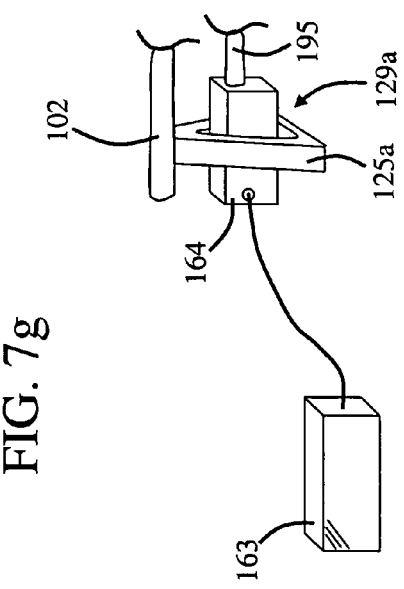
FIG. 7g is a perspective view of the movement motor of FIG. 7e being carried by the stand of FIG. 7c, in accordance with the invention.

FIG. 7g is a perspective view of movement motor 164 being carried by stand 125a, in accordance with the invention. In this embodiment, movement motor 164 extends through stand opening 129a and is coupled to support arm 127. Movement arm 195 extends between movement motor 164 and light collecting module housing 101 (not shown).

FIG. 7h is a top view of a lighting system 100b, in accordance with the invention, positioned on roof 133. In this embodiment, lighting system 100b includes light collecting systems 120a, 120b and 120c, wherein each light collecting system includes light collecting modules 100a, 110b and 100c operatively coupled together. Light collecting modules 100a and 110b are coupled together with an arm 102b, and light collecting modules 100b and 100c are coupled together with an arm 102c. In this way, a desired number of light collecting modules can be easily coupled together with arms so that a desired number of them can be easily positioned on roof 133. The number of light collecting modules positioned on roof 133 depends on many different factors, such as the dimensions of roof 133 and the amount of light it is desired to collect. If one light collecting module fails, it can be easily removed from lighting system 100b and replaced with another light collecting module 100. The light collecting modules of lighting system 100b can also be easily installed and removed from building 100 so that they can be moved from one building to another with less work.

Figure 9A:
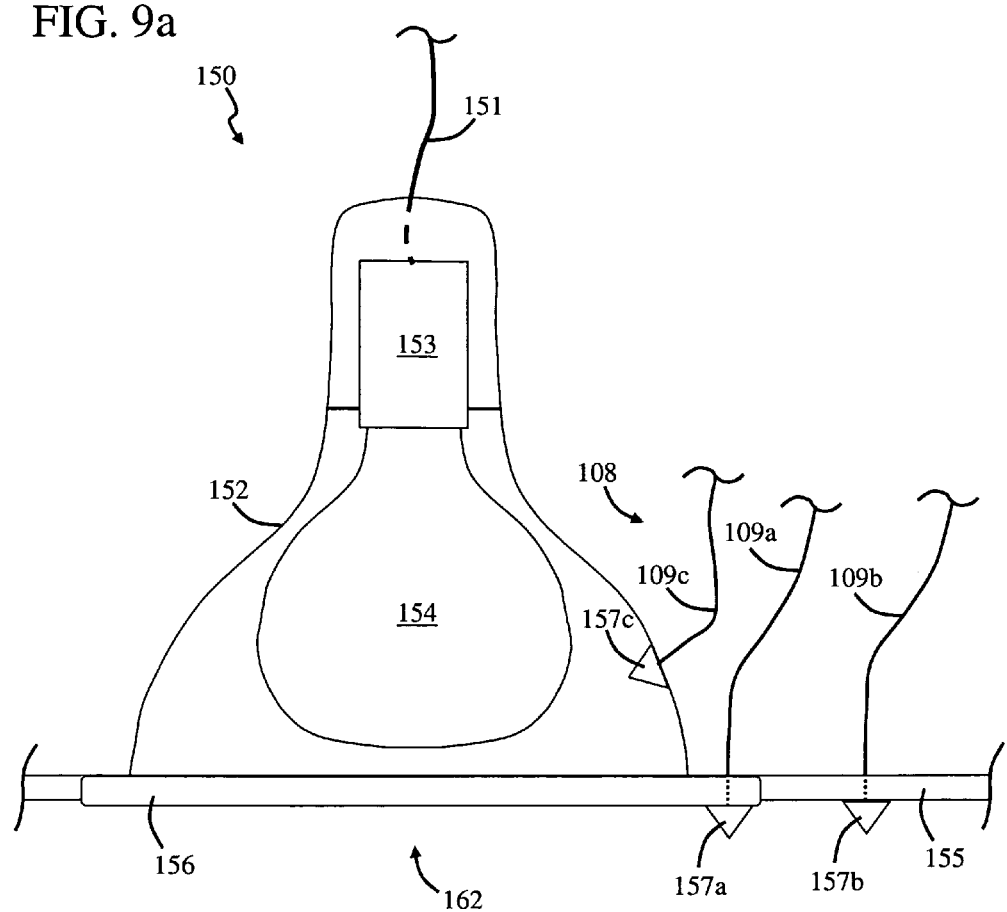

FIGS. 9a and 9b are side and perspective views, respectively, of one embodiment of light emitting fixture 150, in accordance with the invention. There are many different types of light fixtures that can be included in the lighting systems discussed herein, such as those disclosed in U.S. Pat. Nos. D555,825, D553,781, 4,238,815, 5,477,441, 5,570,947, 5,988,836, 6,231,214. Light emitting fixtures that can be modified so they operate as light emitting fixtures of the invention are provided by many different manufacturers, such as Tech Lighting, Ledtronics, Renoma Lighting, Con-tech Lighting, Amerilux Lighting, Halo (a division of Cooper Lighting), Litton Lighting, Starfire, SF Designs, Jesco Lighting, Access Lighting, Thomas Lighting, Iris Lighting Systems, W.A.C. Lighting, LBL Lighting, Leucos, Nora Lighting, Lucifer Lighting, Bruck Lighting Systems, Visualle Architectural Decor, and Lum-Tech, among others.

In this embodiment, light emitting fixture 150 includes a light baffle 152 and power connector 153 operatively coupled to an electrical light source 154. Electrical light source 154 receives power from a power cord 151 through power connector 153, wherein power cord 151 flows an electrical power signal that operates source 154. In this way, electrical light source 154 emits light in response to receiving an electrical signal. Electrical light source 154 can be of many different types, such as one or more light emitting diodes, but here it is embodied as a light bulb. The light bulb can be of many different types, such as a fluorescent light, halogen light and incandescent light, among others. It should be noted that these types of light fixtures are often referred to as recessed canopy light fixtures.

Light fixture 150 includes a faceplate assembly 156 and a lens 159, wherein lens 159 is held to light baffle 152 by faceplate assembly 156. It should be noted that, in some embodiments, light fixture 150 does not include lens 159 and/or faceplate assembly 156.

One or more optical fibers extend proximate to light baffle 152. In this embodiment, three optical fibers are shown to illustrate the different positions they can be relative to light baffle 152, wherein the optical fibers are denoted as optical fibers 109a, 109b and 109c. Optical fibers 109a, 109b and 109c include a single optical fiber, but they generally include one or more. It should be noted that all of optical fibers 109a, 109b and 109c, or one or more of them, can be positioned as shown in FIG. 9a.

In this embodiment, a light disperser is coupled to the light emitting end of the optical fibers positioned proximate to light baffle 152. The light dispersers can be of many different types, but here they are embodied as prisms. In this embodiment, prisms 157a, 157b and 157c are coupled to the light emitting ends of optical fibers 109a, 109b and 109c, respectively. Prisms 157a, 157b and 157c can be coupled to the light emitting ends of optical fibers 109a, 109b and 109c, respectively, in many different ways. In this embodiment, prisms 157a, 157b and 157c are optically coupled to the light emitting ends of optical fibers 109a, 109b and 109c, respectively.

Prisms 157a, 157b and 157c can be positioned at many different locations relative to light baffle 152, several of which are shown in FIG. 9b. For example, in this embodiment, prism 157a is positioned proximate to light baffle 152 and adjacent to ceiling 155. In this way, the light emitting end of optical fiber 109a emits light from a ceiling which carries light emitting fixture 150. Prism 157b is positioned proximate to light baffle 152 and adjacent to ceiling faceplate assembly 156. In this way, the light emitting end of optical fiber 109b emits light from a faceplate assembly of light emitting fixture 150. Further, prism 157c is positioned proximate and adjacent to light baffle 152. In this way, the light emitting end of optical fiber 109c emits light from a light baffle of light emitting fixture 150. It should be noted that all of prisms 157a, 157b and 157c, or one or more of them, can be positioned as shown in FIG. 9a.

The positioning of prisms 157a, 157b and 157c relative to electrical light source 154 allows light emitting fixture to provide a desired pattern of light, wherein electrical light source 154 emits generated light 149 and prisms 157a, 157b and/or 157c emit collected light 148 (FIGS. 1a and 1b). Hence, light emitting fixture 150 is capable of emitting generated light 149 and/or collected light 148.

Figure 9C:
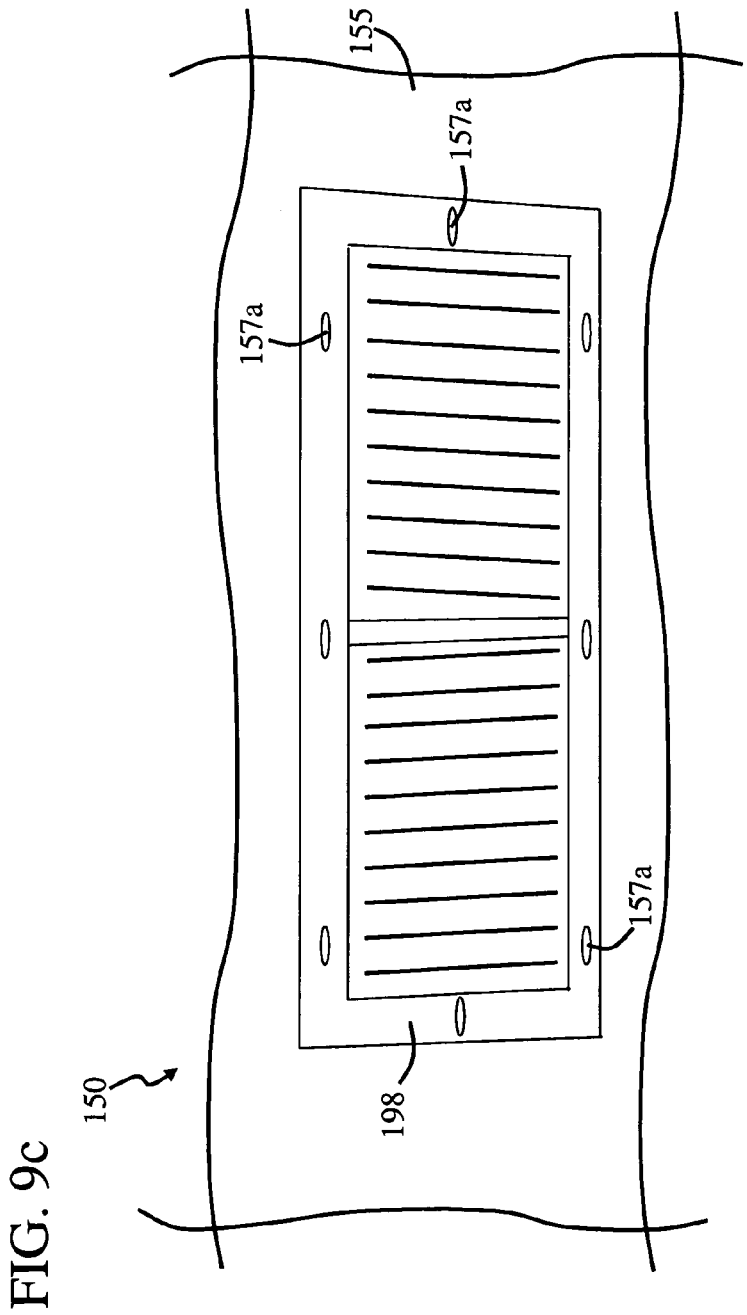
FIG. 9c is a perspective view of a light emitting air conditioning vent, in accordance with the invention.

FIG. 9c is a perspective view of a light emitting air conditioning vent 198, in accordance with the invention. In this embodiment, light emitting air conditioning vent 198 is carried by ceiling 155 and emits air. The air emitting by light emitting air conditioning vent 198 is typically conditioned. The air emitting by light emitting air conditioning vent 198 can be conditioned in many different ways. For example, in some situations, the air emitting by light emitting air conditioning vent 198 is conditioned by cooling it and, in other situations, the air emitting by light emitting air conditioning vent 198 is conditioned by heating it. In accordance with the invention, light emitting air conditioning vent 198 carries prism 157a so that light can be emitted therefrom, as discussed in more detail above with light emitting fixture 150. In this way, light emitting air conditioning vent 198 can emit conditioned air, as well as collected light. It should be noted that, in some embodiments, prisms 157*b* and 157*c* can be positioned proximate to light emitting air conditioning vent 198. In these embodiments, prisms 157*b* and 157*c* can be used to replace prism 157*a*, or prisms 157*b* and 157*c* can be used with prism 157*a*.

Figure 10:
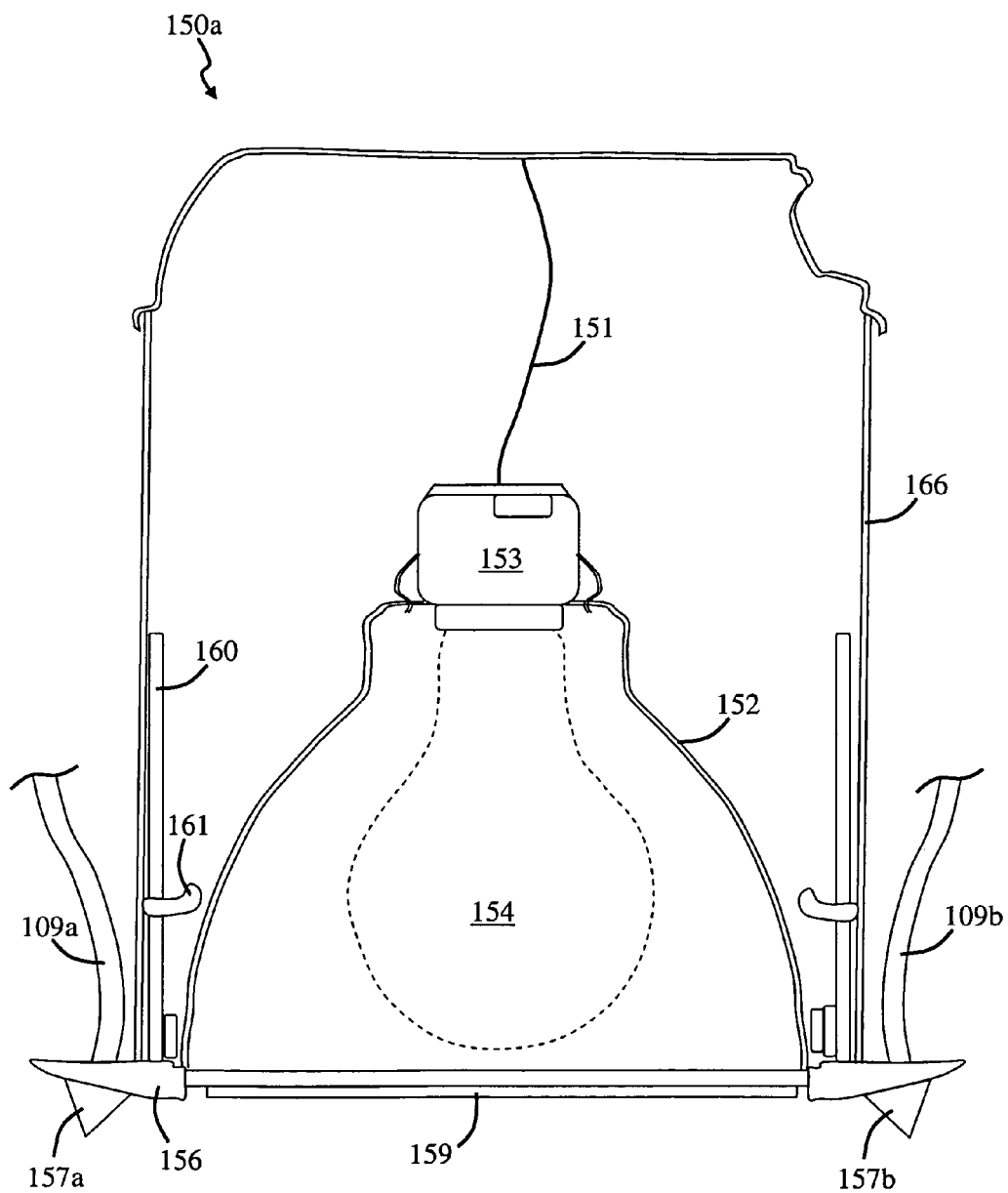
FIG. 10 is a side view of another embodiment of a light emitting fixture, in accordance with the invention.

FIG. 10 is a side view of a light emitting fixture 150*a*, in accordance with the invention. In this embodiment, light emitting fixture 150*a* includes opposed arms 160 coupled to faceplate assembly 156. Further, light emitting fixture 150*a* includes opposed pins 161 coupled to a light housing 166. Opposed arms 160 can be removably coupled to opposed pins 161 in a repeatable manner so that faceplate assembly 156 can be repeatably moved between engaged and disengaged positions with light housing 166. In this way, faceplate assembly 156 can be easily removed and replaced with another one. For example, faceplate assembly 156 can be removed and replaced with one that does not carry prisms. Further, if light emitting fixture 150*a* includes a faceplate assembly that is not modified to carry prisms 157*a* and/or 157*b*, it can be disengaged from light housing 166 and replaced with one that is modified to carry prisms 157*a* and/or 157*b*. It should be noted that light baffle 152 is coupled to light housing 166 through faceplate assembly 156.

In this embodiment, optical fibers 109*a* and 109*b* extend through opposed sides of faceplate assembly 156 and are optically coupled to prisms 157*a* and 157*b*, respectively. Prisms 157*a* and 157*b* are positioned on opposed sides of faceplate assembly 156 so that collected light 148 is flowed from opposed sides of light emitting fixture 150*a*. It should be noted that two optical fibers and two prisms are shown in this embodiment for illustrative purposes. However, in general, one or more optical fibers and their corresponding prisms can be included. The prisms are typically spaced apart from each other so that collected light 148 is flowed from light emitting fixture 150*a* in a desired pattern. In one particular embodiment, the prisms are equidistantly spaced apart from each other around the periphery of faceplate assembly 156. In some embodiments, collected light 148 is emitted from around faceplate assembly 156, as discussed in more detail presently.

Figure 11A:
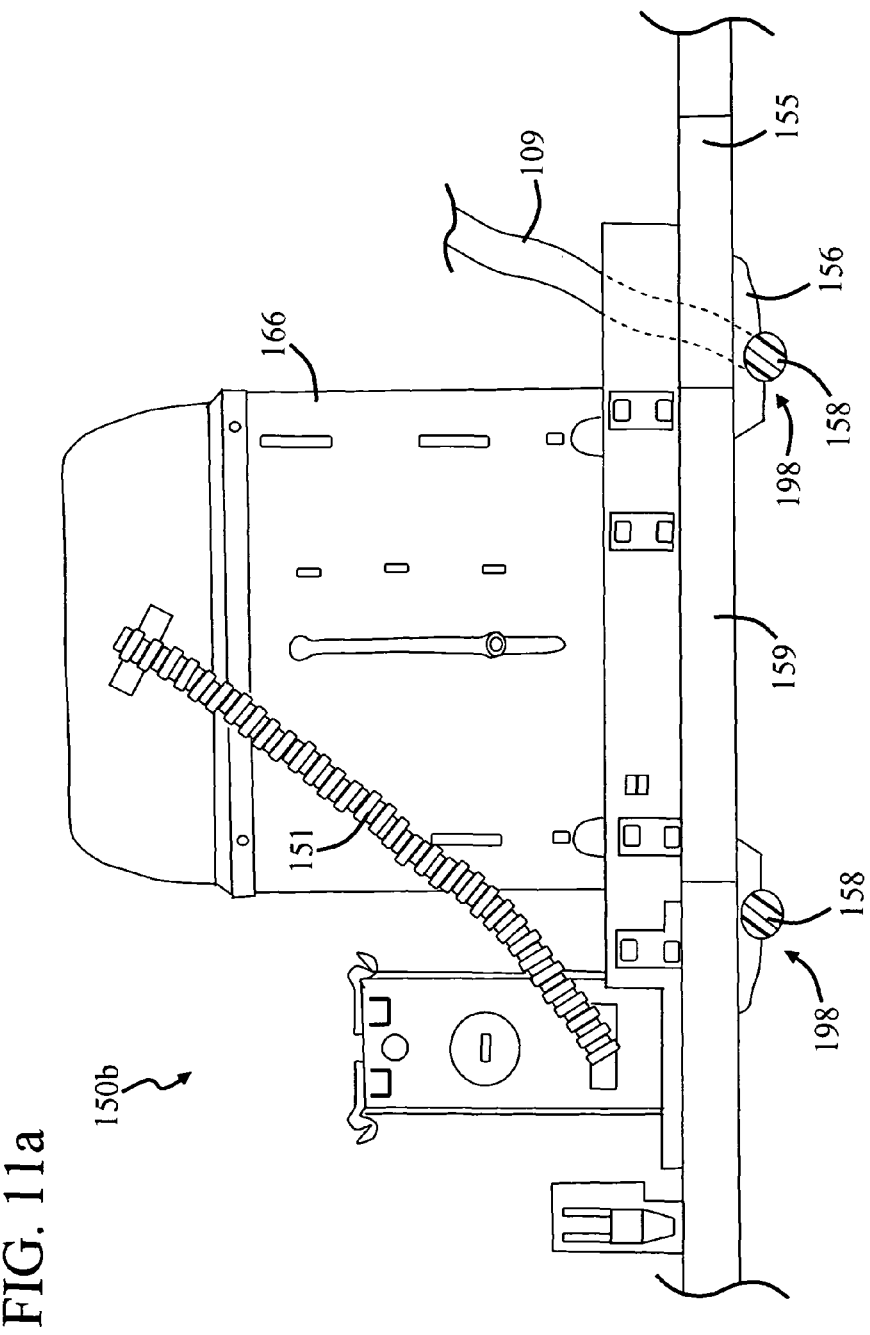
FIG. 11a is a side view of another embodiment of a light emitting fixture, in accordance with the invention.

FIG. 11*a* is a side view of a light emitting fixture 150*b*, in accordance with the invention, which includes faceplate assembly 156 having optically transparent material. In this embodiment, the optically transparent material is in the form of a toroidal light disperser 158 which is coupled to faceplate assembly 156. FIG. 11*b* is a perspective view of toroidal light disperser 158 of FIG. 11*a*. Optical fiber 109 is optically coupled to toroidal light disperser 158 so that collected light 148 is flowed from optical fiber 109 to toroidal light disperser 158 through its light emitting end. Collected light 148 flows around toroidal light disperser 158 so that it is dispersed therein. Collected light 148 flows around toroidal light disperser 158 so that it is emitted from the periphery of faceplate assembly 156. In this way, collected light 148 is flowed from light emitting fixture 150*b* in a circular pattern.

Figure 11C:
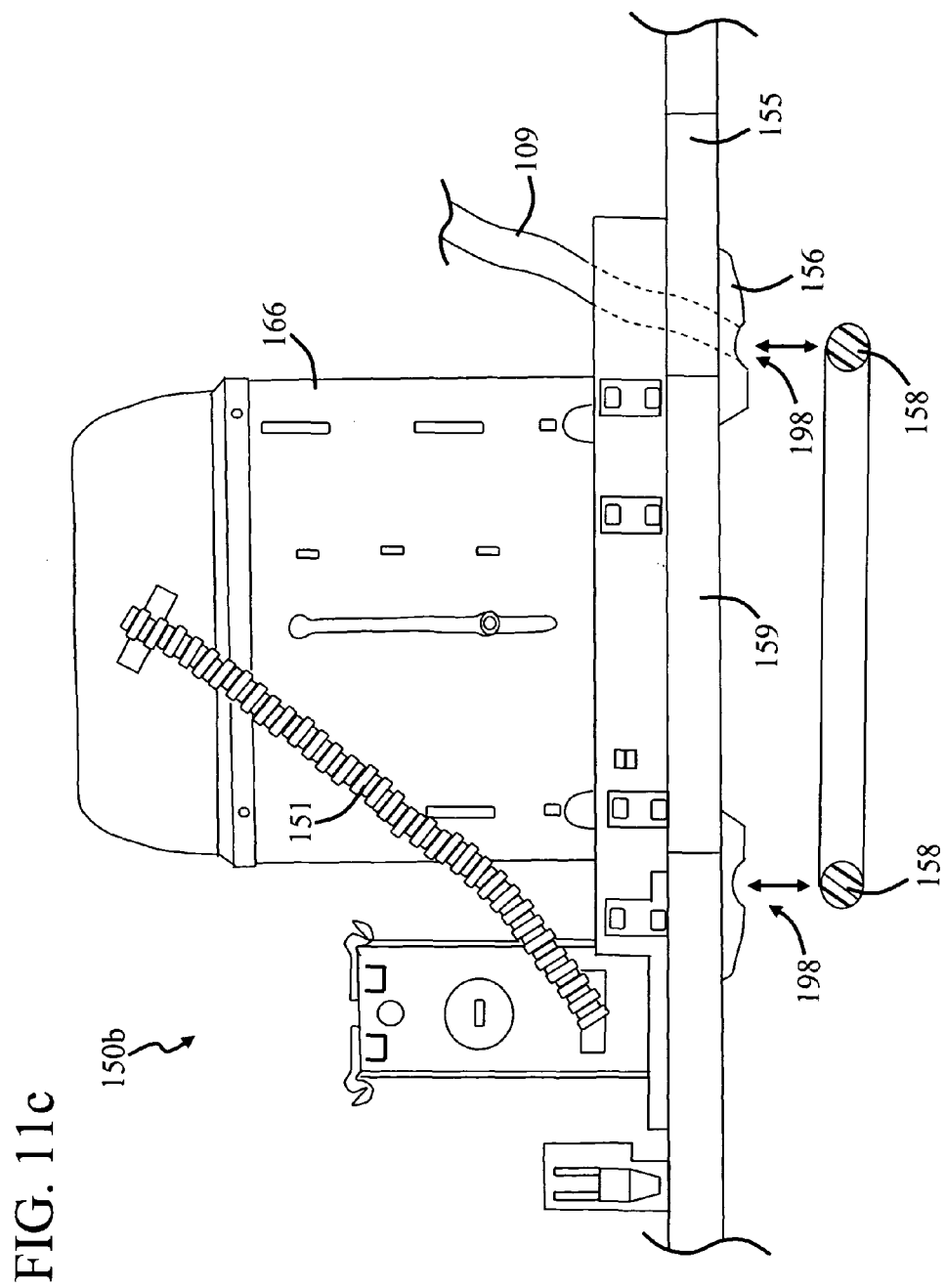
FIG. 11c is a side view of the light emitting fixture of FIG. 11a showing a groove of the faceplate assembly, wherein the groove receives the toroidal light disperser of FIG. 11b.

FIG. 11*c* is a side view of the light emitting fixture 150*b* showing a groove 198 of faceplate assembly 156, wherein groove 198 receives toroidal light disperser 158. As shown in FIGS. 11*a* and 11*c*, toroidal light disperser 158 extends through groove 198 of faceplate assembly 156.

Figure 12B:
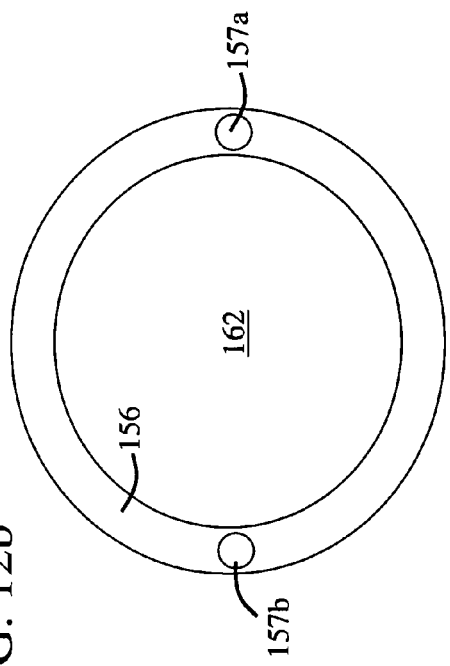
FIGS. 12a, 12b and 12c are bottom views of faceplate assemblies with different light emitting patterns, in accordance with the invention.
Figure 12D:
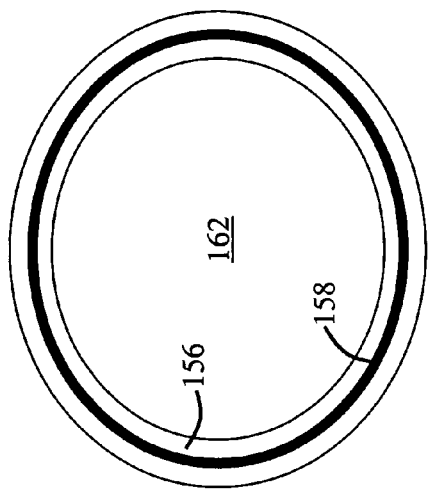
FIG. 12d is a bottom view of a faceplate assembly which carries a toroidal light disperser, in accordance with the invention.
Figure 12A:
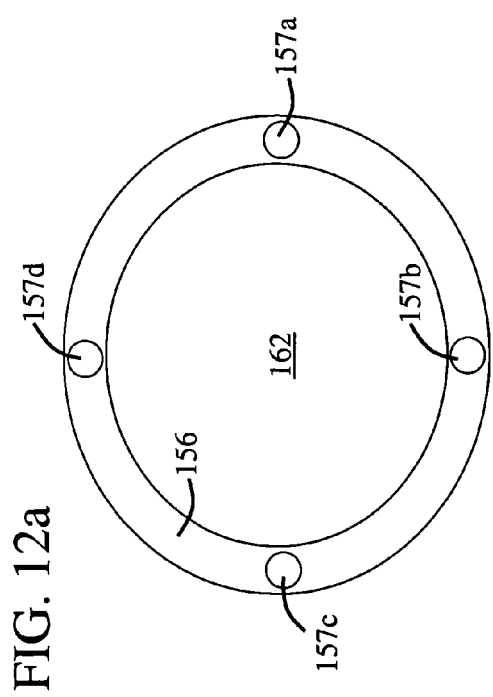
Figure 12C:
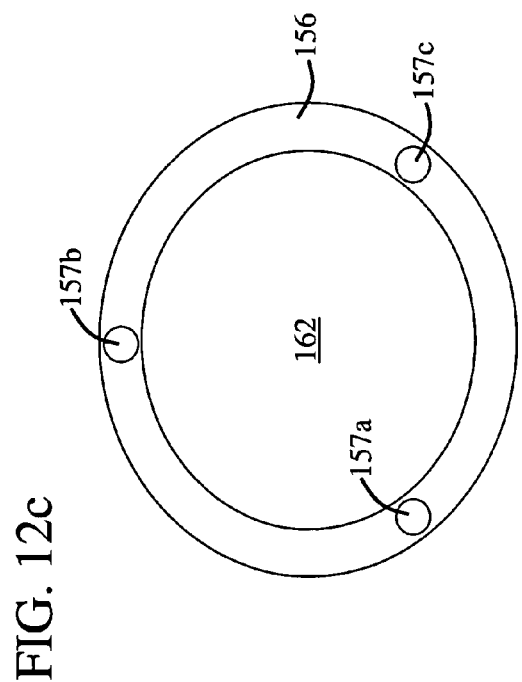

FIGS. 12*a*, 12*b* and 12*c* are bottom views of faceplate assembly 156 with different light emitting patterns, in accordance with the invention. In FIG. 12*a*, four prisms, denoted as prisms 157*a*, 157*b*, 157*c* and 157*d*, are carried by faceplate assembly 156 and equidistantly spaced apart from each other. In FIG. 12*b*, two prisms, denoted as prisms 157*a* and 157*b*, are carried by faceplate assembly 156 and equidistantly spaced apart from each other. In FIG. 12*c*, three prisms, denoted as prisms 157*a*, 157*b* and 157*c*, are carried by faceplate assembly 156 and equidistantly spaced apart from each other. It should be noted that the prisms carried by faceplate assembly 156 do not have to be equidistantly spaced apart from each other, but they are here for illustrative purposes. In FIG. 12*d*, faceplate assembly 156 carries toroidal light disperser 158 which extends around opening 162. Different amounts of light, as well as different light patterns can be chosen by choosing the number and type of light disperser carried by faceplate assembly 156. In this way, the amount of light and the light pattern provided by the light emitting fixture can be controlled. The amount of light it is desired to provide to a room can depend on many different factors, such as the size of the room and the height of the ceiling.

Figure 13A:
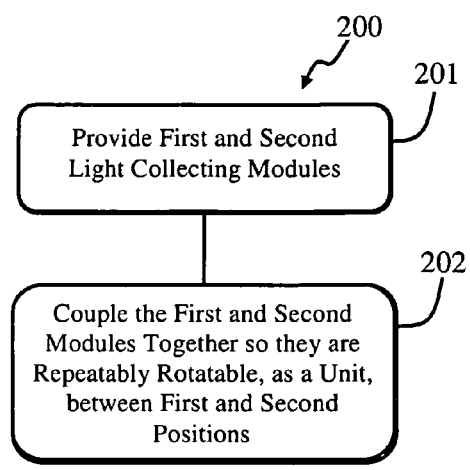
FIGS. 13a, 13b and 13c are block diagrams of methods, in accordance with the invention, of manufacturing a lighting system.

FIG. 13*a* is a block diagram of a method 200, in accordance with the invention, of manufacturing a lighting system. In this embodiment, method 200 includes a step 201 of providing first and second light collecting modules, each having a window and an optical fiber which receives light flowing through the window. In some embodiments, the windows of the first and second light collecting modules are Fresnel lenses. Method 200 includes a step 202 of coupling the first and second modules together so they are repeatably rotatable, as a unit, between first and second positions. The second light collecting module rotates in response to rotation of the first light collecting module.

In some embodiments, method 200 includes a step of providing a rotation motor and operatively coupling it to the first light collecting module. In these embodiments, the second light collecting module is coupled to the rotation motor through the first light collecting module.

In some embodiments, method 200 includes a step of providing a third light collecting module and coupling it to the second light collecting module. The third light collecting module includes a window and an optical fiber which receives light flowing through the window.

Figure 13B:
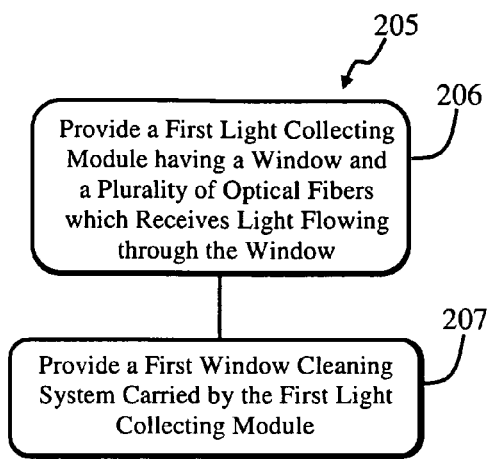

FIG. 13*b* is a block diagram of a method 205, in accordance with the invention, of manufacturing a lighting system. In this embodiment, method 205 includes a step 206 of providing a first light collecting module having a window and a plurality of optical fibers which receives light flowing through the window and a step 207 of providing a first window cleaning system carried by the first light collecting module. The first window cleaning system is repeatably movable relative to the window of the first light collecting module.

In some embodiments, method 205 includes a step of providing a second light collecting module having a window and a plurality of optical fibers which receives light flowing through the window. In these embodiments, a second window cleaning system can be provided and positioned so that it is carried by the second light collecting module. The second window cleaning system is repeatably movable relative to the window of the second light collecting module.

In some embodiments, method 205 includes a step of providing a power system which powers the first and/or second cleaning system. The power system can be of many different types, such as a solar power system.

In some embodiments, method 205 includes a step of providing a rotation motor operatively coupled to the first light collecting module. The first light collecting module rotates in response to the operation of the rotation motor. In some embodiments, the rotation motor is powered by the power system.

In some embodiments, method 205 includes a step of providing a tracking system operatively coupled to the first light collecting module. The first light collecting module is rotated in response to a tracking signal from the tracking system. The tracking system can be operatively coupled to the first light collecting module in many different ways, such as through the rotation motor, wherein the operation of the rotation motor is controlled in response to the tracking signal.

Figure 13C:
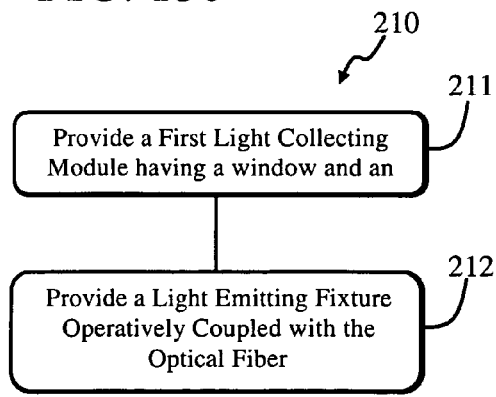

FIG. 13c is a block diagram of a method 210, in accordance with the invention, of manufacturing a lighting system. In this embodiment, method 210 includes a step 211 of providing a first light collecting module having a window and an optical fiber which receives light flowing through the window and a step 212 of providing a light emitting fixture operatively coupled to the optical fiber. The light emitting fixture includes an electrical light positioned proximate to a light emitting end of the optical fiber. The light emitting fixture emits light from the electrical light and/or light emitting end of the optical fiber. In some embodiments, a prism is coupled to the light emitting end of the optical fiber.

In some embodiments, the light emitting fixture is manufactured so that the light emitting end of the optical fiber emits light from a ceiling which carries the light emitting fixture. In some embodiments, the light emitting fixture is manufactured so that the light emitting end of the optical fiber emits light from a baffle of the light emitting fixture. In some embodiments, the light emitting fixture is manufactured so that the light emitting end of the optical fiber emits light from a faceplate assembly included therewith. In some embodiments, the faceplate assembly includes optically transparent material.

Figure 14A:
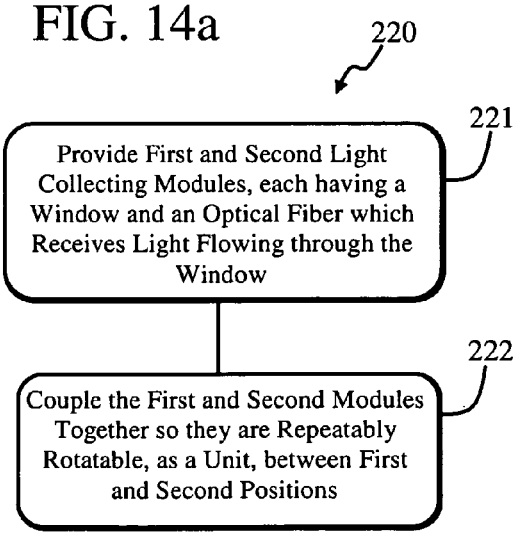

FIG. 14a is a block diagram of a method 220, in accordance with the invention, of installing a lighting system. In this embodiment, method 220 includes a step 221 of providing first and second light collecting modules, each having a window and an optical fiber which receives light flowing through the window. In some embodiments, the windows of the first and second light collecting modules are Fresnel lenses. Method 220 includes a step 222 of coupling the first and second modules together so they are repeatably rotatable, as a unit, between first and second positions. The second light collecting module rotates in response to rotation of the first light collecting module.

In some embodiments, method 220 includes a step of providing a rotation motor and operatively coupling it to the first light collecting module. In these embodiments, the second light collecting module is coupled to the rotation motor through the first light collecting module.

In some embodiments, method 220 includes a step of providing a third light collecting module and coupling it to the second light collecting module. The third light collecting module includes a window and an optical fiber which receives light flowing through the window.

In some embodiments, method 220 includes a step of positioning the lighting system so it is carried by a building. The lighting system can be positioned at many different locations of the building, such as on its roof. The first and second light collecting modules are typically positioned on the roof of the building so that they can rotate without engaging it.

FIG. 14b is a block diagram of a method 225, in accordance with the invention, of installing a lighting system. In this embodiment, method 225 includes a step 226 of providing a first light collecting module having a window and a plurality of optical fibers which receives light flowing through the window and a step 227 of providing a first window cleaning system carried by the first light collecting module. The first window cleaning system is repeatably movable relative to the window of the first light collecting module.

In some embodiments, method 225 includes a step of providing a second light collecting module having a window and a plurality of optical fibers which receives light flowing through the window. In these embodiments, a second window cleaning system can be provided and positioned so that it is carried by the second light collecting module. The second window cleaning system is repeatably movable relative to the window of the second light collecting module.

In some embodiments, method 225 includes a step of providing a power system which powers the first and/or second cleaning system. The power system can be of many different types, such as a solar power system.

In some embodiments, method 225 includes a step of providing a rotation motor operatively coupled to the first light collecting module. The first light collecting module rotates in response to the operation of the rotation motor. In some embodiments, method 225 includes a step of operatively coupling the rotation motor with the power system.

In some embodiments, method 225 includes a step of providing a tracking system operatively coupled to the first light collecting module. The first light collecting module is rotated in response to a tracking signal from the tracking system. The tracking system can be operatively coupled to the first light collecting module in many different ways, such as through the rotation motor, wherein the operation of the rotation motor is controlled in response to the tracking signal. In some embodiments, method 225 includes a step of operatively coupling the tracking system with the power system.

FIG. 14c is a block diagram of a method 230, in accordance with the invention, of installing a lighting system. In this embodiment, method 230 includes a step 231 of providing a first light collecting module having a window and an optical fiber which receives light flowing through the window and a step 232 of providing a light emitting fixture operatively coupled to the optical fiber. The light emitting fixture includes an electrical light positioned proximate to a light emitting end of the optical fiber. The light emitting fixture emits light from the electrical light and/or light emitting end of the optical fiber. In some embodiments, a prism is coupled to the light emitting end of the optical fiber.

In some embodiments, the light emitting fixture is manufactured so that the light emitting end of the optical fiber emits light from a ceiling which carries the light emitting fixture. In some embodiments, the light emitting fixture is manufactured so that the light emitting end of the optical fiber emits light from a baffle of the light emitting fixture. In some embodiments, the light emitting fixture is manufactured so that the light emitting end of the optical fiber emits light from a faceplate assembly included therewith. In some embodiments, the faceplate assembly includes optically transparent material.

In some embodiments, method 230 includes a step of positioning the lighting system so it is carried by a building. For example, the first and second light collecting modules are typically positioned on the roof of the building, and the light emitting fixture is positioned so that it can illuminate the interior of the building. The light emitting fixture can be positioned at many different locations so it can illuminate the interior of the building. For example, the light emitting fixture can be position so that it is carried by a ceiling of the building.

The embodiments of the invention described herein are exemplary and numerous modifications, variations and rearrangements can be readily envisioned to achieve substantially equivalent results, all of which are intended to be embraced within the spirit and scope of the invention.

The invention claimed is:

1. A lighting system, comprising:
   first and second light collecting modules, each having a frame which carries a window and an optical fiber which receives sunlight flowing through the window;
   wherein the first and second light collecting modules include first and second light collecting module housings, respectively, the first and second light collecting module housings being coupled together so the first and second light collecting modules are repeatably rotatable, as a unit, between first and second positions;
   wherein the first and second light collecting module housings carry the corresponding frames; and
   a light emitting fixture optically coupled to the optical fiber of the first light collecting module.

2. A lighting system, comprising:
   first and second light collecting modules, each having a frame which carries a window and an optical fiber which receives light flowing through the window;
   wherein the first and second light collecting modules include first and second light collecting module housings, respectively, the first and second light collecting module housings being coupled together so the first and second light collecting modules are repeatably rotatable, as a unit, between first and second positions;
   wherein the first and second light collecting module housings carry the corresponding frames;
   an electrical light source which emits generated light; and
   wherein the optical fiber of the first light collecting module includes an end that receives collected sunlight and a light emitting end that emits the collected sunlight, wherein the light emitting end is positioned proximate to the electrical light source.

3. A lighting system, comprising:
   first and second light collecting modules, each having a frame which carries a window and a plurality of optical fibers which receives light flowing through the window;
   wherein the first and second light collecting modules include first and second light collecting module housings, respectively, the first and second light collecting module housings being coupled together so the first and second light collecting modules are repeatably rotatable, as a unit, between first and second positions;
   wherein the first and second light collecting module housings carry the corresponding frames;
   an electrical light source which emits generated light;
   wherein the plurality of optical fibers of the first light collecting module emit collected sunlight from light emitting ends in response to receiving incident sunlight at corresponding light collecting ends; and
   an annular faceplate assembly, wherein the light emitting ends of the optical fibers of the first light collecting module emit the collected sunlight from the annular faceplate assembly, and the generated light flows through a central opening of the annular faceplate assembly.

4. A lighting system, comprising:
   first and second light collecting modules, each having a frame which carries a window and an optical fiber which receives sunlight flowing through the window;
   wherein the first and second light collecting modules include first and second light collecting module housings, respectively, the first and second light collecting module housings being coupled together so the first and second light collecting modules are repeatably rotatable, as a unit, between first and second positions;
   wherein the first and second light collecting module housings carry the corresponding frames;
   a reflective light baffle;
   an electrical light source which emits generated light in response to an electrical signal, wherein the generated light is reflected by the reflective light baffle; and
   wherein the optical fiber of the first light collecting module emits the sunlight from a light emitting end of the optical fiber in response to receiving the sunlight at a light collecting end of the optical fiber.

5. A lighting system, comprising:
   a first light collecting module, which includes a first frame which carries a first window, and a first optical fiber which receives light flowing through the first window;
   a second light collecting module, which includes a second frame which carries a second window, and a second optical fiber which receives light flowing through the second window;
   wherein the first and second light collecting modules include first and second light collecting module housings, respectively, the first and second light collecting module housings being coupled together so the first and second light collecting modules are repeatably rotatable, as a unit, between first and second positions;
   wherein the first and second light collecting module housings carry the first and second frames, respectively;
   an electrical light source which emits generated light; and
   wherein the first optical fiber includes an end that receives collected sunlight and a light emitting end that emits the collected sunlight, wherein the light emitting end is positioned proximate to the electrical light source and emits the collected sunlight away from the electrical light source.

6. The system of claim 5, further including an annular faceplate assembly, wherein the light emitting end of the first optical fiber emits the collected sunlight away from the annular faceplate assembly and electrical light source.

7. The system of claim 6, wherein the faceplate assembly includes optically transparent material.

8. The system of claim 6, further including a reflective light baffle, wherein the light emitting end of the first optical fiber emits the collected sunlight from the annular faceplate assembly, and the generated light is reflected by the reflective light baffle and through a central opening of the annular faceplate assembly.

9. The system of claim 8, further including a lens which is held to the reflective light baffle by the annular faceplate assembly.

10. The system of claim 6, further including a light disperser carried by the annular faceplate assembly, wherein the light emitting end of the first optical fiber flows the collected sunlight to the light disperser.

11. The system of claim 10, further including a lens carried by the faceplate assembly.

12. The system of claim 6, wherein the electrical light source emits generated light through a central opening of the annular faceplate assembly.

13. The system of claim 6, further including a toroidal light disperser carried by the faceplate assembly.

14. The system of claim 13, wherein the collected sunlight flows through the toroidal light disperser.

15. The system of claim 14, wherein the generated light flows through a central opening of the toroidal light disperser.

16. The system of claim 6, wherein the first optical fiber engages the annular faceplate assembly, and extends through opposed sides of the annular faceplate assembly.

17. The system of claim 5, further including a light disperser engaged with the light emitting end of the first optical fiber.

18. The system of claim 5, wherein the collected sunlight includes focused sunlight.

19. The system of claim 5, further including a window, wherein the incident sunlight flows through the window to the end of the first optical fiber which receives collected sunlight.

20. The system of claim 5, further including a lens, wherein the incident sunlight flows through the lens to the end of the first optical fiber which receives collected sunlight.

21. The system of claim 5, further including a Fresnel lens, wherein the incident sunlight flows through the Fresnel lens to the end of the first optical fiber which receives collected sunlight.

22. A lighting system, comprising:
a first light collecting module, which includes a first frame which carries a first window;
a second light collecting module, which includes a second frame which carries a second window;
wherein the first and second light collecting modules include first and second light collecting module housings, respectively, the first and second light collecting module housings being coupled together so the first and second light collecting modules are repeatably rotatable, as a unit, between first and second positions;
wherein the first and second light collecting module housings carry the first and second frames, respectively;
an electrical light source which emits generated light;
a plurality of optical fibers which emit collected sunlight from light emitting ends of the optical fibers in response to receiving incident sunlight at their corresponding light collecting ends, wherein the collected sunlight flows through the first and second windows; and
an annular faceplate assembly, wherein the light emitting ends of the optical fibers emit the collected sunlight from the annular faceplate assembly, and the generated light flows through a central opening of the annular faceplate assembly.

23. The system of claim 22, further including a plurality of light dispersers carried by the annular faceplate assembly, wherein the light dispersers emit the collected sunlight from the optical fibers.

24. The system of claim 22, further including a plurality of light dispersers optically coupled to corresponding light emitting ends of the optical fibers.

25. The system of claim 24, wherein the plurality of light dispersers are equidistantly spaced apart from each other around the faceplate assembly.

26. The system of claim 22, further including a toroidal light disperser engaged with the faceplate assembly, wherein the toroidal light disperser extends through a groove of the faceplate assembly.

27. The system of claim 22, wherein the light emitting ends extend through opposed sides of the annular faceplate assembly.

28. The system of claim 27, wherein the light emitting ends of the optical fibers are equidistantly spaced apart from each other around the faceplate assembly.

29. A lighting system, comprising:
a first light collecting module, which includes a first frame which carries a first window;
a second light collecting module, which includes a second frame which carries a second window;
wherein the first and second light collecting modules include first and second light collecting module housings, respectively, the first and second light collecting module housings being coupled together so the first and second light collecting modules are repeatably rotatable, as a unit, between first and second positions;
wherein the first and second light collecting module housings carry the first and second frames, respectively;
a reflective light baffle;
an electrical light source which emits generated light in response to an electrical signal, wherein the generated light is reflected by the reflective light baffle;
wherein the first and second optical fibers each include light emitting and light collecting ends, wherein the first optical fiber emits collected sunlight from the light emitting end in response to receiving incident sunlight at the light collecting end; and
an annular faceplate assembly, which is repeatably moveable between coupled and uncoupled positions with the reflective light baffle.

30. The system of claim 29, wherein the light emitting end of the first optical fiber emits the collected sunlight from the annular faceplate assembly.

31. The system of claim 29, further including a prism which is optically coupled with the light emitting end of the first optical fiber and engaged with the annular faceplate assembly.

32. The system of claim 29, further including a toroidal light disperser optically coupled with the light emitting end of the first optical fiber, wherein the toroidal light disperser is coupled to the reflective light baffle by the annular faceplate assembly.

33. The system of claim 32, wherein the generated light flows through a central opening of the toroidal light disperser.

34. The system of claim 29, wherein the light emitting end of the optical fiber emits the collected sunlight in the direction of the reflected generated light.

35. The system of claim 29, wherein the light emitting end of the optical fiber is engaged with the faceplate assembly.

36. A system, comprising:
a first light collecting module, which includes a first frame which carries a first window;
a second light collecting module, which includes a second frame which carries a second window;
wherein the first and second light collecting modules include first and second light collecting module housings, respectively, the first and second light collecting module housings being coupled together so the first and second light collecting modules are repeatably rotatable, as a unit, between first and second positions;
wherein the first and second light collecting module housings carry the corresponding frames;
a light emitting fixture, which includes
a light housing;
an annular faceplate assembly coupled to the light housing;
a light baffle coupled to the light housing through the faceplate assembly;
a power connector carried by the light baffle;
an electrical light source which emits generated light through a central opening of the annular faceplate assembly, wherein the electrical light source is operatively coupled to the power connector; and
a first optical fiber with a first light emitting end which extends through the annular faceplate assembly, wherein the first light emitting end emits collected sunlight provided by the first light collecting module.

37. The system of claim 36, wherein the first optical fiber extends through opposed sides of the faceplate assembly.

38. The system of claim 36, further including a power cord connected to the power connector, the power cord extending through the light housing.

39. The system of claim 36, wherein the annular faceplate assembly is repeatably moveable between coupled and uncoupled positions with the light baffle.

40. The system of claim 36, wherein the light baffle extends between the light housing and electrical light source.

41. The system of claim 36, wherein the light baffle reflects the generated light through the central opening of the annular faceplate assembly.

42. The system of claim 36, further including a second optical fiber with a second light emitting end that emits the collected sunlight, wherein the second light emitting end extends through the faceplate assembly.

43. The system of claim 42, wherein the first and second optical fibers are positioned at opposed sides of the opening of the annular faceplate assembly.

* * * * *